(12) United States Patent
Glew et al.

(10) Patent No.: US 8,930,714 B2
(45) Date of Patent: Jan. 6, 2015

(54) ENCRYPTED MEMORY

(75) Inventors: Andrew F. Glew, Hillsboro, OR (US);
Daniel A. Gerrity, Seattle, WA (US);
Casey T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/136,400

(22) Filed: Jul. 29, 2011
(Under 37 CFR 1.47)

(65) Prior Publication Data
US 2013/0022201 A1    Jan. 24, 2013

Related U.S. Application Data

(63) Continuation-in-part of application No. 13/136,024, filed on Jul. 19, 2011, and a continuation-in-part of application No. 13/136,401, filed on Jul. 29, 2011.

(51) Int. Cl.
*G06F 21/00* (2013.01)
*G06F 21/72* (2013.01)

(52) U.S. Cl.
CPC ............................ *G06F 21/72* (2013.01)
USPC .................................. 713/190; 713/193

(58) Field of Classification Search
USPC .................................. 713/190, 193
See application file for complete search history.

(56) References Cited

U.S. PATENT DOCUMENTS

| | | | |
|---|---|---|---|
| 4,525,599 A * | 6/1985 | Curran et al. ............... | 713/190 |
| 5,437,032 A | 7/1995 | Wolf et al. | |
| 5,623,637 A | 4/1997 | Jones et al. | |
| 6,006,328 A | 12/1999 | Drake | |
| 6,057,598 A * | 5/2000 | Payne et al. ............... | 257/723 |
| 6,154,741 A | 11/2000 | Feldman | |
| 6,654,745 B2 | 11/2003 | Feldman | |
| 6,996,547 B1 * | 2/2006 | Tugenberg et al. ......... | 705/77 |
| 7,054,190 B2 * | 5/2006 | Hanyu et al. ............... | 365/171 |
| 7,107,176 B2 | 9/2006 | Henry et al. | |
| 7,124,170 B1 | 10/2006 | Sibert | |
| 7,165,150 B2 | 1/2007 | Alverson et al. | |
| 7,221,600 B2 * | 5/2007 | Hara et al. ............... | 365/189.08 |
| 7,379,999 B1 | 5/2008 | Zhou et al. | |
| 7,395,414 B2 | 7/2008 | Le et al. | |
| 7,502,946 B2 | 3/2009 | Perkins et al. | |
| 7,533,273 B2 | 5/2009 | Patariu et al. | |
| 7,549,054 B2 | 6/2009 | Brodie et al. | |
| 7,594,111 B2 | 9/2009 | Kiriansky et al. | |

(Continued)

FOREIGN PATENT DOCUMENTS

WO    WO 01/99075 A2    12/2001

OTHER PUBLICATIONS

Adya et al.; "FARSITE: Federated, Available, and Reliable Storage for an Incompletely Trusted Environment"; 5th Symposium on Operating Systems Design and Implementation; bearing a date of Dec. 2002; pp. 1-14; Boston, MA.

(Continued)

*Primary Examiner* — Michael Pyzocha

(57) ABSTRACT

A memory device is operable to perform channel encryption wherein for communication between devices, each includes cryptographic logic and performs cryptographic operations. In an illustrative embodiment, the memory device can comprise memory operable to store data communicated via a communication channel from a processor, and logic operable to perform channel encryption operations on the communication channel that communicates information between the processor and the memory.

47 Claims, 17 Drawing Sheets

(56) References Cited

U.S. PATENT DOCUMENTS

| | | | |
|---|---|---|---|
| 7,620,941 B1 | 11/2009 | Leventhal | |
| 7,644,162 B1 | 1/2010 | Zhu et al. | |
| 7,676,578 B1 | 3/2010 | Zhu et al. | |
| 7,757,282 B2 | 7/2010 | Pandit et al. | |
| 7,861,305 B2 | 12/2010 | McIntosh et al. | |
| 7,870,610 B1 | 1/2011 | Mitchell et al. | |
| 7,873,998 B1 | 1/2011 | Wilkinson et al. | |
| 7,877,585 B1 | 1/2011 | Coon et al. | |
| 7,953,986 B2 | 5/2011 | Lee | |
| 7,958,558 B1 | 6/2011 | Leake et al. | |
| 8,022,724 B1* | 9/2011 | Jenkins, IV | 326/38 |
| 8,099,574 B2 | 1/2012 | Savagaonkar et al. | |
| 8,136,158 B1 | 3/2012 | Sehr et al. | |
| 8,146,106 B2 | 3/2012 | Kim et al. | |
| 8,281,388 B1 | 10/2012 | Sobel et al. | |
| 8,286,250 B1 | 10/2012 | Le et al. | |
| 8,312,509 B2 | 11/2012 | Zimmer et al. | |
| 8,381,192 B1 | 2/2013 | Drewry et al. | |
| 8,397,238 B2 | 3/2013 | Venkumahanti et al. | |
| 8,510,827 B1 | 8/2013 | Leake et al. | |
| 8,555,390 B2 | 10/2013 | Thiebeauld de la Crouee et al. | |
| 8,683,581 B2 | 3/2014 | Lefloch | |
| 8,688,583 B2 | 4/2014 | Boccon-Gibod et al. | |
| 8,694,947 B1 | 4/2014 | Venkataramani et al. | |
| 2002/0040420 A1* | 4/2002 | Yamauchi et al. | 711/118 |
| 2002/0075844 A1 | 6/2002 | Hagen | |
| 2002/0141577 A1* | 10/2002 | Ripley et al. | 380/201 |
| 2002/0142833 A1 | 10/2002 | Tsuchida et al. | |
| 2002/0152212 A1 | 10/2002 | Feldman | |
| 2002/0156939 A1 | 10/2002 | Armstrong et al. | |
| 2002/0166058 A1* | 11/2002 | Fueki | 713/194 |
| 2003/0084308 A1* | 5/2003 | Van Rijnswou | 713/189 |
| 2003/0182436 A1 | 9/2003 | Henry | |
| 2003/0187974 A1 | 10/2003 | Burbeck et al. | |
| 2004/0054925 A1 | 3/2004 | Etheridge et al. | |
| 2004/0116183 A1 | 6/2004 | Prindle | |
| 2004/0117639 A1* | 6/2004 | Mowery | 713/187 |
| 2004/0117790 A1 | 6/2004 | Rhine | |
| 2004/0153318 A1 | 8/2004 | Chamberlain | |
| 2004/0199763 A1 | 10/2004 | Freund | |
| 2005/0060710 A1 | 3/2005 | Kush | |
| 2005/0138074 A1 | 6/2005 | O'Connor et al. | |
| 2005/0160428 A1 | 7/2005 | Ayachitula et al. | |
| 2005/0171903 A1 | 8/2005 | Yacobi et al. | |
| 2005/0177596 A1 | 8/2005 | Wu et al. | |
| 2005/0213751 A1 | 9/2005 | Apostolopoulos et al. | |
| 2005/0232415 A1* | 10/2005 | Little et al. | 380/28 |
| 2005/0268075 A1 | 12/2005 | Caprioli et al. | |
| 2006/0005082 A1 | 1/2006 | Fossum et al. | |
| 2006/0161715 A1* | 7/2006 | Hamaguchi | 710/311 |
| 2006/0161978 A1 | 7/2006 | Abadi et al. | |
| 2007/0022287 A1 | 1/2007 | Beck et al. | |
| 2007/0079304 A1 | 4/2007 | Zheng et al. | |
| 2007/0101433 A1 | 5/2007 | Louch et al. | |
| 2007/0240215 A1 | 10/2007 | Flores et al. | |
| 2007/0250837 A1 | 10/2007 | Herington et al. | |
| 2008/0028467 A1 | 1/2008 | Kommareddy et al. | |
| 2008/0052541 A1 | 2/2008 | Ginter et al. | |
| 2008/0104004 A1 | 5/2008 | Brave et al. | |
| 2008/0114990 A1 | 5/2008 | Hilbert et al. | |
| 2008/0168279 A1* | 7/2008 | Kanai | 713/190 |
| 2008/0250216 A1 | 10/2008 | Kershaw et al. | |
| 2008/0256346 A1 | 10/2008 | Lee et al. | |
| 2008/0263663 A1 | 10/2008 | Ide et al. | |
| 2008/0276317 A1 | 11/2008 | Chandola et al. | |
| 2008/0279371 A1* | 11/2008 | Lee et al. | 380/42 |
| 2008/0301467 A1* | 12/2008 | Saito | 713/190 |
| 2008/0313482 A1 | 12/2008 | Karlapalem et al. | |
| 2008/0320565 A1 | 12/2008 | Buch et al. | |
| 2009/0006755 A1 | 1/2009 | Illikkal et al. | |
| 2009/0007125 A1 | 1/2009 | Barsness et al. | |
| 2009/0028135 A1 | 1/2009 | Mantripragada et al. | |
| 2009/0063824 A1 | 3/2009 | Leaback et al. | |
| 2009/0106563 A1 | 4/2009 | Cherpantier | |
| 2009/0144557 A1 | 6/2009 | Sutton | |
| 2009/0172686 A1 | 7/2009 | Chen et al. | |
| 2009/0183263 A1 | 7/2009 | McMichael et al. | |
| 2009/0187771 A1* | 7/2009 | McLellan, Jr. | 713/193 |
| 2009/0210881 A1 | 8/2009 | Duller | |
| 2009/0222910 A1 | 9/2009 | Le Bihan et al. | |
| 2009/0265712 A1 | 10/2009 | Herington | |
| 2009/0282474 A1 | 11/2009 | Chen et al. | |
| 2009/0320129 A1 | 12/2009 | Pan et al. | |
| 2009/0320136 A1 | 12/2009 | Lambert et al. | |
| 2010/0165991 A1 | 7/2010 | Veal et al. | |
| 2010/0191349 A1 | 7/2010 | Munaga | |
| 2010/0281273 A1 | 11/2010 | Lee et al. | |
| 2010/0299305 A1 | 11/2010 | Laxman et al. | |
| 2010/0318998 A1 | 12/2010 | Golla | |
| 2011/0029140 A1 | 2/2011 | Jordan et al. | |
| 2011/0129024 A1 | 6/2011 | Karthik et al. | |
| 2011/0131402 A1 | 6/2011 | Mittal | |
| 2011/0131550 A1 | 6/2011 | Burckhardt et al. | |
| 2011/0131658 A1 | 6/2011 | Bahl | |
| 2011/0138124 A1 | 6/2011 | Hill et al. | |
| 2011/0138473 A1 | 6/2011 | Yee et al. | |
| 2011/0179176 A1 | 7/2011 | Ravichandran et al. | |
| 2011/0202927 A1 | 8/2011 | Miloushev et al. | |
| 2011/0289586 A1 | 11/2011 | Kc et al. | |
| 2011/0307382 A1 | 12/2011 | Siegel et al. | |
| 2011/0314254 A1 | 12/2011 | Smriti et al. | |
| 2012/0079492 A1 | 3/2012 | Chambliss et al. | |
| 2012/0102489 A1 | 4/2012 | Staiman et al. | |
| 2012/0159183 A1* | 6/2012 | Adams et al. | 713/189 |
| 2012/0179952 A1 | 7/2012 | Tuyls et al. | |
| 2012/0185863 A1 | 7/2012 | Krstic et al. | |
| 2012/0210325 A1 | 8/2012 | de Lind van Wijngaarden et al. | |
| 2012/0221591 A1 | 8/2012 | Yerneni et al. | |
| 2012/0255018 A1 | 10/2012 | Sallam | |
| 2012/0255021 A1 | 10/2012 | Sallam | |
| 2012/0265975 A1 | 10/2012 | Kimelman | |
| 2012/0266243 A1 | 10/2012 | Turkulainen | |
| 2012/0278903 A1 | 11/2012 | Pugh | |
| 2013/0024867 A1 | 1/2013 | Glew et al. | |
| 2013/0081039 A1 | 3/2013 | Glew et al. | |
| 2013/0111489 A1 | 5/2013 | Glew et al. | |
| 2013/0111491 A1 | 5/2013 | Glew et al. | |
| 2013/0246605 A1 | 9/2013 | Mahadik et al. | |
| 2013/0305243 A1 | 11/2013 | Hiki | |

OTHER PUBLICATIONS

Kolbitsch et al.; "Extending Mondrian Memory Protection"; Information Systems and Technology Panel (IST) Symposium, Tallinn, Estonia; bearing a date of Nov. 22-23, 2010; pp. 10-1 through 10-18 and 1 Report Documentation Page; NATO-OTAN.

Stone, Harold S.; "A Logic-in-Memory Computer"; IEEE Transactions on Computers; bearing a date of Jan. 1970; pp. 73-78.

Bird et al.; "Lighthouse: Hardware Support for Enforcing Information Flow Control on ManyCore Systems"; bearing a date of 2008; 10 pages.

Clause et al.; "Dytan: A Generic Dynamic Taint Analysis Framework"; ISSTA '07; bearing a date of Jul. 9-12, 2007; pp. 196-206; ACM.

Ho et al.; "Practical Taint-Based Protection using Demand Emulation"; EuroSys '06; bearing a date of Apr. 18-21, 2006; 13 pages; ACM.

Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.

Schwartz et al.; "All You Ever Wanted to Know About Dynamic Taint Analysis and Forward Symbolic Execution (but might have been afraid to ask)"; 2010 IEEE Symposium on Security and Privacy; bearing a date of 2010; pp. 317-331; IEEE.

Song et al.; "BitBlaze: A New Approach to Computer Security via Binary Analysis"; ICISS 2008; bearing a date of 2008; pp. 1-25; Springer-Verlag Berlin Heidelberg.

(56) References Cited

OTHER PUBLICATIONS

Yin et al.; "Panorama: Capturing System-wide Information Flow for Malware Detection and Analysis"; CCS '07; bearing a date of Oct. 29-Nov. 2, 2007; pp. 116-127; ACM.

Zeldovich et al.; "Hardware Enforcement of Application Security Policies Using Tagged Memory"; bearing a date of 2008 (as provided by examiner), printed Feb. 7, 2013; pp. 1-16; located at: http://static.usenix.org/events/osdi08/tech/full_papers/zeldovich/zeldovich_html/.

Zhang et al.; "Neon: System Support for Derived Data Management"; VEE '10; bearing a date of Mar. 17-19, 2010; 12 pages; ACM.

Abadi et al.; "Control-Flow Integrity: Principles, Implementations, and Applications"; bearing a date of Nov. 1, 2004; pp. 1-33.

Kiriansky et al.; "Secure Execution Via Program Shepherding"; Proceedings of the 11$^{th}$ USENIX Security Symposium; bearing a date of Aug. 2002, created on Dec. 9, 2013; pp. 1-16; San Francisco, CA.

"Instruction Set"; Wikipedia; bearing a date of May 15, 2010; pp. 1-10; located at: https://en.wikipedia.org/wiki/Instruction_set.

\* cited by examiner

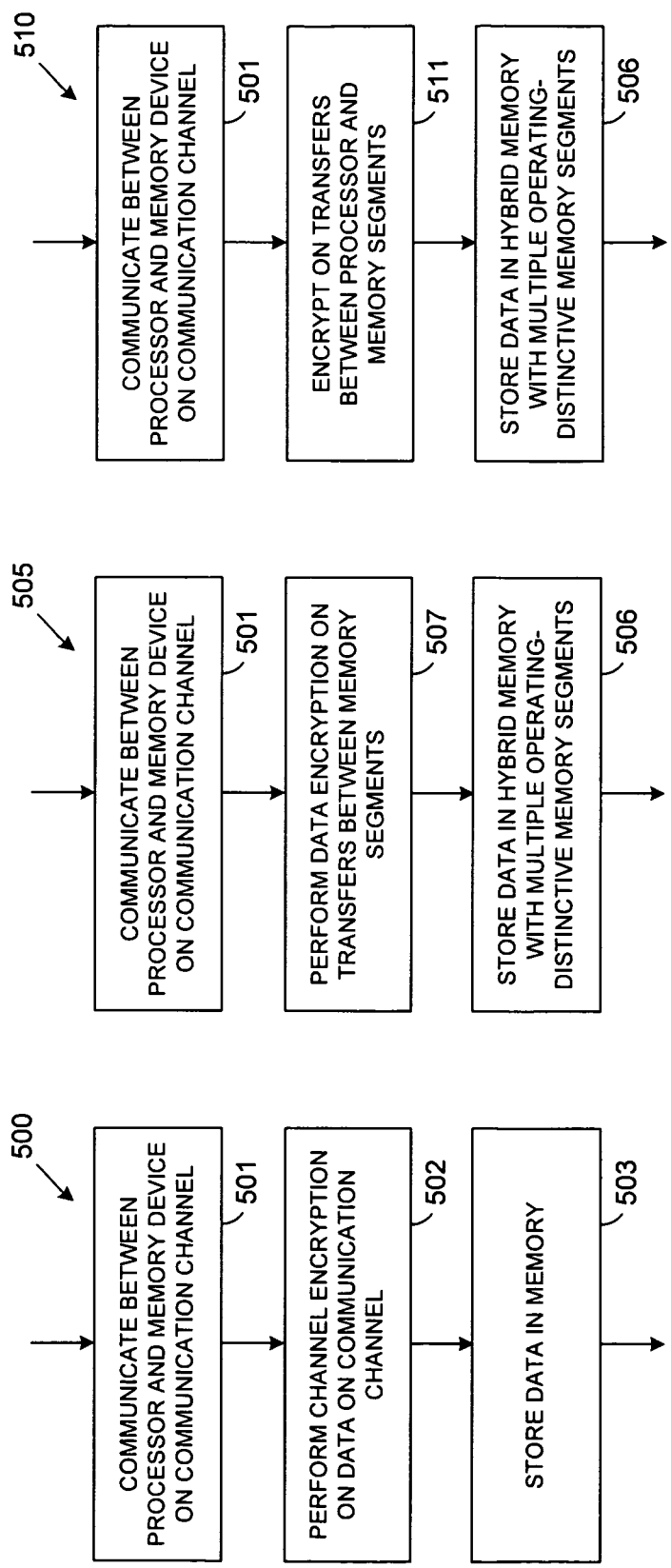

ENCRYPTED MEMORY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:

(1) the present application constitutes a continuation-in-part of U.S. patent application Ser. No. 13/136,024, entitled "CONTROL FLOW INTEGRITY", naming Andrew F. Glew, Daniel A. Gerrity, and Clarence T. Tegreene, as inventors, filed Jul. 19, 2011, which is currently co-pending, or is an application of which a currently co-pending application is entitled to the benefit of the filing date; and (2) the present application constitutes a continuation-in-part of U.S. patent application Ser. No. 13/136,401, entitled "FINE-GRAINED SECURITY IN FEDERATED DATA SETS" naming Andrew F. Glew, Daniel A. Gerrity, and Clarence T. Tegreene, as inventors, filed on Jul. 29, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Malicious software, also called malware, refers to programming (code, scripts, active content, and other software) designed to disrupt or deny operation, gather information to violate privacy or exploitation, gain unauthorized access to system resources, and enable other abusive behavior. The expression is a general term used by computer professionals to mean a variety of forms of hostile, intrusive, or annoying software or program code.

Malware includes various software including computer viruses, worms, Trojan horses, spyware, dishonest adware, scareware, crimeware, rootkits, and other malicious and unwanted software or program, and is considered to be malware based on the perceived intent of the creator rather than any particular features. In legal terms, malware is sometimes termed as a "computer contaminant," for example in the legal codes of U.S. states such as California.

SUMMARY

Embodiments of a memory device are operable to perform channel encryption wherein for communication between devices, each includes cryptographic logic and performs cryptographic operations. In an illustrative embodiment, the memory device can comprise memory operable to store data communicated via a communication channel from a processor, and logic operable to perform channel encryption operations on the communication channel that communicates information between the processor and the memory.

BRIEF DESCRIPTION OF THE DRAWINGS

Embodiments of the invention relating to both structure and method of operation may best be understood by referring to the following description and accompanying drawings:

FIGS. 5A through 5M are schematic flow charts illustrating embodiments of a method for to performing channel encryption.

DETAILED DESCRIPTION

Figure 1A:
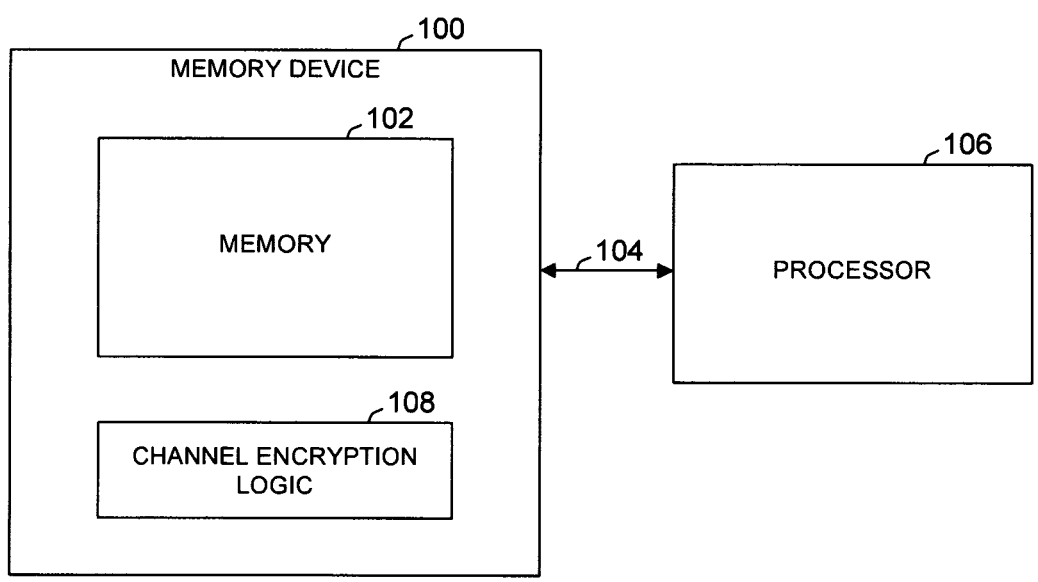
FIGS. 1A, 1B, and 1C are schematic block diagrams depicting embodiments of a memory device operable to perform channel encryption which, as distinguished from storage encryption, involves communication between devices, each of which includes cryptographic logic and performs cryptographic operations.

In various embodiments, computer systems can be configured to include one or more of several improvements that facilitate security. A smart memory module can complement security operations of a processor to substantially enhance security capabilities. One beneficial aspect of using the smart memory module is that an equivalent or greater strength security can be attained with a relatively lower strength encryption (and thus lower computation burden) imposed on a device sending data to the memory. Channel encryption between the processor and the smart memory module enables numerous aspects of security. The smart memory module can be configured in combination with the processor to perform channel encryption. In some configurations and applications, a cryptographic and temper-handling perimeter can be constructed for security enhancement. A cryptographic and/or tamper-handling (tamper-evident, tamper-resistant, and the like) perimeter can be formed within a smart memory module, enclosing the entire smart memory module, between dynamic random access memory (DRAM) and the smart memory module, between non-volatile random access memory (RAM) and the smart memory module, or any other suitable position. The cryptographic and/or tamper-handling perimeter can further be generalized for positioning between a smaller amount of memory and a larger amount of memory in the smart memory module. Some embodiments can include a cryptographic perimeter in the absence of a tamper-handling perimeter.

Various embodiments of computer systems can support cryptographic security with a range of distributions of channel encryption and storage encryption. In some embodiments, a security perimeter can be a cryptographic and/or tamper-handling perimeter developed around a table of keys. In some arrangements, storage encryption can take advantage of address randomization used in a memory outside a security perimeter within a smart memory module.

In various embodiments, processing functionality in general and specifically security processing can execute in association with memory. Such processing can be within or near the memory. Typically, a processor or logic can perform security functionality with a portion of computation taking place in association with the memory and another portion of computation performed external to the memory, for example in a processor that exchanges communication with the memory.

Memory with associated logic enables sending of encrypted code to the memory, further enabling security across a security perimeter enclosing the memory. A security perimeter is highly useful in various information technology fields including financial services, on-line commerce, multi-player online gaming, and many others.

In example functionality, the smart memory can hold information in memory in encrypted form and can decrypt the information during transfer to registers of a processor enabled to execute the code. In contrast, traditional shared memory holds information in unencrypted form, allowing reading by unauthorized software or users.

Accordingly, processing can be removed from a processor and transferred to logic associated with memory. One technique for shifting computation can be to send an address in the memory and running code at the address. However, when executing remote procedure calls, whether the calls are present in a library cannot be assumed so that copying of the code into memory prior to execution may be necessary. A message for such a procedure call can include a program and a pointer to data. In another model, a message can replace the concept of a pointer with that of an offset (for example to improve speed performance as in an eXtensible Markup Language (XML) application). In a further model, a message can include code, a copy of the code, and a copy of the data operated upon by the code. In an extreme example, the message can include an entire library that is transferred in one communication.

In still another model, a message can be used with a template, including part of the code but not the complete code. The message can be used to fill in part of the template. Part of the code can be previously installed in the memory and the message can include one or more instruction pointers and another portion of the code to be copied to the memory prior to execution. In some example models, the message can further include additional information such as a signature of the copied code (for instance, for information communicated back and forth to designate whether the code has loaded). Usage of a template model can enable various functionality, for example dynamic generation of code, von Neumann architecture (a single storage structure for program code and data), and the like.

In various embodiments and applications, the template can be fixed-frame or variable-frame. For example, fixed-sized frames are standard on TCP-IP networks while super-computer networks typically use variable-sized frames. Frames for a template may also be configured in a manner suitable for arranging code and data. For example, a configuration can be arranged into one page of code and one page of data to facilitate page permissions at the destination, enabling a direct memory access (DMA) type functionality that is operational across and between memory systems or subsystems, on different physical machines and different memory systems. For a system that sends a page of code and a page of data, either can be only partially full or filled to capacity, possibly generating a fault for an overflow condition. Even when the pages are only partially full, the sending of pages is highly efficient due to the ability to avoid sending of control information. The system can perform DMA into memory or into a reception area. Page granularity may be suitable for usage of virtual memory at the destination. Templates can be configured for any suitable size.

In a specific example illustrating use of a template, a program code may lack certain items, such as an EAX instruction, a register, and memory locations M0100 and M0200. The template may indicate that memory location M0100 is not available and is currently used by another process (P1). A request can be sent to the process (P1) in control of M0100 which can fill the location and send back the data or run corresponding code. Similarly, if memory location M0200 is also not available and currently controlled by still another processor (P2), the request can be sent to the processor (P2). When all the data or code is available, the code can be run.

New addressing modes can facilitate usage of templates. For example, a "message-relevant addressing mode" can enable sending some of the data (such as a binary tree). A pointer may be unsuitable for identifying the address for receiving the data because the address may not be known. Thus, a relative pointer or offset can designate the destination address. Multiple addressing modes can be implemented for usage in various conditions and situations. For example, in shared memory, the message can include an instruction pointer to data and the memory can have associated logic to execute the code. In unshared memory, the instructions can be copied and then executed. Security can be enforced, for example, for a process that attempts to branch to an instruction (or instructions) which are not copied to memory by the process, a fault can be generated and the proper instruction(s) made available. A similar concept can be implemented for data where a subset of the data and a subset of the instructions can be sent for execution.

Smart Memory

A smart memory module comprised of memory and associated logic, when combined with security functionality enables creation of program code that is execute-only and cannot be read. The logic associated with the memory can make the memory unreadable by software. The smart memory can be used in combination with a tamper-handling device or component to prevent or avoid physical intrusion, thus protecting against an intruder reading the code via a logic analyzer or similar device.

The smart memory module can be an interconnect network for a multiprocessor system. Traditionally, a processor can interact with dumb memory (such as DRAM) and interact with an interconnect network such as Hypertransport (Advanced Micro Devices (AMD), QuickPath Interconnect (QPI from Intel), and the like. Using such dumb memory, remote requests for memory have to go through the processor to the memory. By introducing smart memory modules, much functionality can be implemented on the smart memory module. Systems can be created that are not processor-heavy, where the processor communicates with the smart memory module and the smart memory module can be the connection to the interconnect fabric of the system. The smart memory module enables a high degree of security functionality, every channel, interconnection channel, Hypertransport, QPI, or whatever is the current interface can be encrypted, fundamentally facilitating channel encryption. The smart memory module thus facilitates increased integration and enables new aspects of system repartitioning. For example the, Hypertransport and QPI interface functionality can be removed from the processor and repartitioned to the smart memory module. An example system embodiment can include Hypertransport and QPI interconnect both on the processor and the smart memory module. Two additional types of interconnect can be supported: 1) the Hypertransport or QPI interface on the processor, and 2) an interface to a smart memory module or modules.

In other example embodiments, the interprocessor interconnect can be cache-coherent, with an inter-memory module interconnect that is not cache-coherent. The smart memory module thus can enable differentiation between processors. Furthermore, the smart memory module can enable significant flexibility in allocating and distributing cache coherence and cache non-coherence, for example among processors and input/output (I/O) devices, and among various types of I/O. In a specific illustration, performance-sensitive I/O can be done without cache-coherence since cache-coherence costs both in power and performance.

The smart memory modules can be configured to facilitate systems with a mixture of cache-coherence and non-cache-coherence. For example, an existing super-computer uses a Partition-Globalized Address Space (GPAS), physically-realized with nodes of 4, 8, or 16 cache-coherent shared memory systems, and additional non-cache-coherent shared memory. A program executing on one processor is allowed access to information on another processor with some limitation to cross-processor snooping. The program executing on a first processor and performing a remote access to a second processor may be required to manage coherence. Logic in the smart memory module can be configured to enable various possible operations. The processor-side interconnect and the smart memory module interconnect can be different in various aspects and one possible difference is cache coherence. In various systems and/or conditions, the smart memory module can be optimized for larger interconnections, for various sizes of transfers such as large or small transfers, cache coherence, and the like. One aspect of optimizing for transfer size can be that large transfers may be more efficient in transfers directly to memory, but often small transfers can be efficient since: (a) small transfers may already be used for synchronization of very big programs, (b) transfer of a 64-byte cache line is not needed and efficient transfers are possible, for example, by incrementing a counter indicating all of a large number of processors completed and the counter can be just 32-bits wide, (c) data may be narrow and a poor arrangement for caching, and the like.

In cloud computing configurations, security may be sought simply by distributing program code into the cloud servers and executing the code remotely so that intruders don't have a centralized area from which to read the program code. Security based on decentralization in this manner may be insufficient since the code is unprotected in the cloud. Smart memory improves security by encrypting in memory so that every line that goes out of the cache is encrypted. Smart memory can also be configured to implement one or more of a variety of security schemes including channel encryption, storage encryption, RSA (Rivest, Shamir, Adleman) cryptography and key distribution, Public Key Infrastructure (PKI).

In a Public Key Infrastructure (PKI) implementation, smart memory can be used, for example, to distribute keys for a simple-stream cipher in which a state register such as a shift register emits a bit stream with feedback following a distributed initial state. A processor is used with memory, possibly of various forms such as dynamic random access memory (DRAM), random access memory (RAM), in combination with a logic chip interface. If, the processor interacts with the DRAM directly, the processor can provide encryption for data which is stored. When the data is read back from the DRAM, the read value should be the same as the written value. Encryption should be sufficient to handle multiple attacks. Channel encryption is a highly suitable technique for encrypting the interaction between the processor and memory because, in channel encryption, both the interacting processor and memory begin in a hard-wired initial state with a shared key, which is the state used for an eXclusive-OR (XOR) vector. The processor and memory begin with the shared key and periodically can change the shared key using PKI. Very strong encryption can be used to handle persistent storage. For communication across the channel encryption can easily and inexpensively be performed simply by XORing against the bitstream. Some embodiments can use other or additional security measures, for example using Advanced Encryption Standard (AES) cryptography, elliptical code cryptography, PKI, or other encryption techniques on every data packet.

In various embodiments, a smart module can include security features, for example for digital rights management (DRM) and other applications. Conventional computer systems combine processors and memory, for example a processor connected with at least two Dual Inline Memory Modules (DIMMs), each having at least nine or eighteen memory chips. Conventional computer systems can be enhanced by upgrading with one or more smart memory modules to improve security capabilities. The smart memory module can be a fully integrated module with a processor, a partially integrated module with an interface chip, or other arrangements. Thus, a processor and smart memory in a computer system can be configured over a range of integration from processor and memory integrated on the same chip, separate integrated chips in a common package and with close coupling, separate memory and processor chips that are coupled or built tightly together, stacker processor and memory chips (for example, DRAM stacked over processor or processor over DRAM) or others. One of the challenges in integrating the processor and the memory on a single chip is the fundamental difference in silicon process technology for the two types of circuits. In DRAM processes, transistors are relatively slow but are stable and hold charge for relatively long time duration. In contrast, processor process technology is generally very different from a memory process and involves many layers of metal and includes faster and leakier transistors. The fundamental difference in processes increases the cost in integrating processor and memory on the same chip at least 20% and often significantly more.

In an example embodiment, a processor can be separate from a smart memory module. In a particular example arrangement, the smart memory module can be composed of two to four DRAM chips, and possibly additional memory, interface logic, and/or a package. The interface logic may be constructed on a separate logic interface chip, for example a chip built in a process sufficiently fast to enable communication with the processor.

In another example system, a processor and a smart memory module can be combined with one or more DRAM chips. The DRAM can operate with increased efficiency by eliminating the logic interface or by integrating the processor with the logic interface so that the processor is positioned as close to the DRAM as possible.

A system with the processor manufactured separately from the smart memory module (DRAM) enables cost and performance advantages, and enables evolutionary changes in the DRAM interface. The interface between the logic device, the interface chip, and a memory chip may change over time. An advantage of a smart memory module configured as a hybrid logic/memory module is increased flexibility with regard to standardization since the interface is internal to the integrated circuit chip and can be evolved in concert with upgrades to the logic and memory, fostering innovation by reducing hindrance via aspects of organizational or political resistance. In contrast, for memory and logic that are integrated and manufactured separately, modifying the interface between the circuits can cause difficulty.

In various embodiments, the smart memory module can be implemented in different ways, for example logic-in-memory (logic integrated into a memory chip, or logic partially integrated into the memory chip), logic in an interface chip closely associated with memory, logic located near the memory or in close association with the memory, processor-in-memory, and the like. From a different perspective, logic can be integrated into a memory chip, an interface chip, a DIMM, or the like, or the logic can be installed on a memory board. Logic can be placed at some location in a memory system, for example outside the processor and close to the memory.

The smart memory module can be configured to have a more direct interconnection to the various systems, devices, and I/O channels than simply connected to the nearest processor.

The smart memory module can be configured with logic operable to perform various aspects of encryption. Memory encryption can enable security operations for various reasons. For example, memory encryption can be implemented to protect against attempts by malware or viruses to break into a system. Memory encryption can also be used to prevent or make more difficult unauthorized copying of a program executing on a machine, an aspect of Digital Rights Management (DRM) since a user typically has a contractual right to run a program but not the right to make a copy. Similarly, a user of a program active in an operation such as an online game running on the Internet can have the contractual right to play the game but not to access the program code for the game and to make a modification. Another application for memory encryption can be protection of highly sensitive information on a server, for example banking operations run on the server in combination with a client machine over a user interface. Some banking calculations such as actual trusted financing logic can be run on the client machine. Encryption can be used to prevent unauthorized user access to sensitive code and data.

Memory encryption can be desirable for several reasons. Memory encryption can be used in smart cards with a processor that encrypts all information transferred to main memory. Some smart cards can perform operations such as randomization of addresses, for example writing to address 100 and 101, but the smart card processor might randomize the address or encrypt the address with a key so that the correct address 101 goes to address 63. The logic pattern can be changed and some of the operations performed by processor modified such as inserting random traps. The smart memory module can be used for encrypting memory avoiding problems with encryption that is otherwise slow and costly.

System embodiments can realize cryptographic security using storage encryption, channel encryption, or a combination of storage and channel encryption. Storage encryption is generally more computationally expensive in comparison to relatively less expensive channel encryption.

Storage Encryption

Storage encryption is the use of encryption/decryption of backed-up and archived data both in transit and on storage media. The encrypted data is typically stored on a storage device such as DRAM or a persistent storage device (a disk). The encrypted data can remain available for access indefinitely and a relentless attacker can perform extensive analysis of bit patterns to defeat security. Thus, strong encryption is desired to maintain security. A minimum storage encryption used at the present time is Advanced Encryption Standard (AES) or triple-AES.

In storage encryption, data is encrypted. Some systems or devices can increase security of storage encryption by performing address randomization in which encrypted data is stored in a cryptographically hidden address. Address randomization is useful since the addresses accessed supply ample clues as to what data is stored. Furthermore, techniques are known for breaking into systems simply by monitoring addresses, even while disregarding the data that is stored. Encrypting the address substantially increases the complexity of storage encryption since more devices than a central processing unit (CPU) can supply data to the memory, for example direct memory address (DMA) devices, disk devices, and others.

Channel Encryption

Channel encryption can improve performance and economy in various applications and conditions in comparison to expensive storage encryption. Smart memory module integrated circuits can facilitate good memory encryption, for example between a processor and memory stack. An illustrative configuration can include a CPU that interacts with a memory stack comprising multiple DRAM chips and a logic chip operable to perform strong channel encryption between the CPU and the memory stack. Information can be stored in the memory stack unencrypted or the logic can encrypt the data for storage. Thus, channel encryption can be performed between the CPU and a logic chip, enabling cryptographic security without requiring storage encryption of data stored in the logic chip.

Channel encryption, as distinguished from storage encryption, involves communication between devices, each of which includes cryptographic logic and performs cryptographic operations. In contrast, storage encryption is characterized by a first device with logic, for example a processor, exchanging information with a second device without logic, such as a disk or DRAM.

An illustrative example can be used to distinguish between storage encryption and channel encryption. The logical operations of storage encryption can be performed by a processor (conventionally for storing data to dumb memory). In storage encryption, the processor can write data D to an address A by encrypting the data D into encrypted value E(D), and writing the encrypted value E(D) to the address A. When retrieving from the address A, the encrypted value E(D) is read from the address A so that the value the processor sends out and reads back is the same. In contrast, in an illustration of channel encryption both address A and data D can be encrypted into encrypted value $E_1(A,D)$. A different encrypted value $E_2(A,D)$ can be read back because the encryption state has advanced to a different position according to a key schedule or a long-term pad that is used. Thus in channel encryption, a different encryption value can be returned in comparison to that written out. A fundamentally static character is a substantial security limitation of storage encryption. In storage encryption, the same value is written and read back. The interaction is not time-varying. Channel encryption enables improved security due to a lack of predictability from the perspective of a snooper or attacker. Channel encryption further enables dynamic security with multiple intermediate points. A storage device can be created that includes a random number generator or can contain an internal key. Channel encryption via usage of a smart memory enables randomization of encrypted information wherein encrypted data is read back and encryption can be stripped off by the receiving processor. A memory device with logic or other smart component enables time-varying encryption. Data is written to an address which, when read back, is different, but no information is lost since the reading processor or other reading device at the opposite side of the channel from the smart memory has sufficient intelligence capability to strip off the encryption.

A further security feature of channel encryption can be attained by creating a smart memory module configured to change addresses over time. The smart memory module can change the address mapping to DRAM or other memory in any suitable manner so long as the processor communicating with the smart memory module can reprogram the address mapping in a corresponding manner. The two sides of the channel—the processor and the smart memory module—can be configured so that data D1 at address A1 and at time T1 is known at time T2 to read address A2 to retrieve the correct data.

Channel encryption can improve security performance by exploiting the consideration that encryption is not expected to be for long term. An objective of channel encryption can be to encrypt data that is passing from one party to another using a cryptographic engine such as a one-time pad. Both sides have the same cryptographic model which corresponds to the key exchange and are suitably operational by maintaining synchrony between the two sides.

The interaction can be illustrated by considering single-ended channel encryption. Data can be sent from side A to side B of the channel. The interchange can be bidirectional in which side A sends to side B and side B sends to side A. The greatest possibilities for improving channel encryption are available for bidirectional interchange, for example by continually generating new random numbers and changing encryption parameters dynamically.

Channel encryption can be performed using two intercommunicating smart devices, one of which is typically a processor and the other can be a variety of storage devices configured as logic, for example included in interface logic, in a smart memory module. For channel encryption, a sending device such as a processor need not specify a storage address for storing transmitted data to the receiving storage device. Instead, a stream of commands can be transmitted which contain a mixture of address and data information.

A very simple example of a channel encryption technique is a one-time pad, a cryptography technique in which each bit or character of plaintext is encrypted by a modulation addition with a bit or character from a secret random pad or key of the same length as the plaintext, resulting in a ciphertext. A one-time pad is a random bit stream. Both ends of the channel have a one-time pad and, when sending, EXOR the data to be sent with a one-time pad, then send the encrypted data. Pad-encrypted data is sent back and forth. An attacker can only break the channel by knowing and using the one-time pad.

Another example of a channel encryption technique can use a starting random number and communicating the random number between two ends of the channel, typically a processor and a smart memory module. The random number can drive a pseudo-random number generator which is generally a short-term, finite-length one-time pad. Periodically, the processor, the smart memory module, or both create new random numbers, possibly by including internal integrated random number generators. Thus, some embodiments of a smart memory module can further comprise an integrated random number generator.

An example channel encryption technique can operate wherein both sides of the channel have a key and use stream encryption, using any desired form of stream encryption ranging from full public key encryption to pseudo-random generator techniques, to more simple streaming ciphers. Full public key encryption may be prohibitively expensive computationally and used for only some especially secure transactions. Pseudo-random generator techniques have medium complexity and used with various stream ciphers such as AES or blowfish (a keyed, symmetric block cipher). AES is relatively strong encryption and can typically be used for storing in memory, although with a relatively large computational expense. Relatively simple streaming ciphers can be used when writing to a memory location and reading back from the same location to retrieve the same data, giving ample opportunity for attack.

Channel encryption can guarantee that for every time read data is EXORed with another random number or otherwise combined with another random number so that the same pattern will not be seen multiple times.

Channel encryption techniques can use a key exchange or an exchange of random numbers which can be used as keys. Channel encryption facilitates protection of the exchange of keys from an observer. Various protocols can be used for original key distribution.

For channel encryption between a processor and smart memory module, both sides of the channel use keys available at power-up. For example, the processor and the smart memory module can each have their own keys. In one example of initialization, keys can be specific to each individual processor chip and each individual smart memory module. In other examples, one key can be assigned for each processor type from a particular manufacturer and/or one key assigned for all smart memory modules from a particular memory supplier. Sharing a key among multiple devices can severely weaken security due to the risk of a break-once, run-everywhere (BORE) attack. In various implementations, the key can be a public key, private key, symmetric key, or other key. A public key, private key infrastructure can be used to include a private key and a public key for both devices in many protocols. The computational burden of a public key, private key infrastructure is likely immaterial in an initial boot condition because initialization is infrequently performed.

At power-up, the private key is set (and secret) and the public key is broadcast to the world. The smart memory module has to determine what public key corresponds to the processor. The processor has to determine what public key corresponds to the smart memory module. In an example implementation, the key identification can be hard-wired, for example for about a dozen different processor manufacturers, twelve keys can be supplied in the system. In another arrangement, the key can be accessed via the Internet so that, for example, the system can bootstrap load and the processor requests the smart memory module from identification (and possibly version). The smart memory module can return a public key, an unforgeable hash, a challenge response such as that used in Diffie-Hellman processing, or the like. Then the processor can go to the Internet to verify the hash is proper and have the device authenticated.

For authentication of keys without using Internet connectively, a device can use storage such as cache and some initial set of trusted devices.

The processor can authenticate the smart memory module to protect against a man-in-the-middle attack in which an attacker has a logic analyzer connected between the processor and smart memory module to access, modify, and send data transmitted between the processor and the smart memory module.

Channel encryption can be facilitated by integrating a random number generator in the smart memory module since random number generation is highly useful on both the processor and memory sides of the channel. However, channel encryption can be performed in the absence of a random number generator on the smart memory module.

Systems can implement channel encryption in numerous variations. For example, channel encryption can be performed between the processor and smart memory module without using any form of storage encryption in the smart memory module, simply relying on the security of the smart memory module to protect for many purposes and attacks. Another implementation can create a tamper-proof perimeter, tamper-evident, or tamper-resistant perimeter around the smart memory module, such as the circuitry to detect liquid nitrogen. An entire range of security capabilities can be enabled, depending on how much security is needed, the type of attacks to be prevented, and characteristics of the application within which security is applied. For example, an on-line game might not call for storage encryption inside the smart memory module and can be disabled to increase operating speed while giving a desired amount of protection.

Security Perimeter

A system can include the concept of a security perimeter which combines cryptographic and physical security. A basic aspect of the security perimeter can be a perimeter beyond which all information is encrypted. For example, hardware security can be formed by a hardware perimeter. One or more security perimeters can be positioned in a predetermined manner, for example enclosing selected computers (even an entire personal computer), devices or systems, and can be nested.

In some embodiments, cryptographic security can be enforced through operations of a smart memory module. Information, including program code and/or data, inside a security perimeter can be decrypted in plain text and unprotected. Information outside the security perimeter can be protected, encrypted to make unauthorized access more difficult. Information is encrypted while passing across the security perimeter.

Various configurations of security perimeters can be formed within and/or external to the smart memory module.

In some configurations, a system can include multiple security perimeters. If desired, security perimeters can be nested, for example to include an innermost perimeter defining an area that is totally unencrypted, an area around the innermost area that is fairly weakly encrypted, and an enclosing area around the inner perimeters with a fairly strong encryption.

A security perimeter may be useful for implementing a digital rights management (DRM) security application. In a data center or in an application where the quality of security is important, various circumstances may be pertinent to determining what level of security to apply. For example, various degrees of trust may apply to the network, service providers, servers, client computers, and the like. A rented or borrowed user computer may have a very low level of trust with a user having little protection from access of user information by the owner or controller of the computer. Similarly, a user accessing servers of a client may voluntarily expose information to a service provider. For example, a user preparing taxes using a tax preparation service in a cloud can assume the provider has access to social security and tax numbers, and must determine whether the provider can be trusted. A user of a data center must also determine whether to trust the managers and system administrators who may be low-paid students or workers who may be very technically competent for accessing information. In such conditions, a user may desire to protect the data such as by encrypting data that is running in a public application or public system.

Another application can be protection of data on handheld wireless devices or cell phones. A password can be stored on a cell phone and can be stolen to enable access to confidential information.

The security perimeter can also include protection against physical access or attack, for example a tamper perimeter or physical security perimeter. Both physical security and electrical (or cryptographic) security can be associated with the security perimeters. In practice, a system can be configured with multiple perimeters of various cryptographic and physical security characteristics. A tamper-handling technique can be tamper-proof, tamper-resistant, tamper-evident methods. Tamper-proofing relates to a technique that absolutely prevents tampering, generally an impossible goal in view of the possibility of unlimited access, time, and expense which can be applied by a dedicated attacker. A tamper-evident technique relates to the ability to detect an attack. Tamper-resistance means tampering is made more difficult—how long an attack can be resisted attack from a suitably motivated attacker.

Physical security in forming a physical perimeter can be organized in various selected manners according to expected attack mode. A threat model can be derived according to what is to be protected against. A server farm can be owned and controlled by various entities, each of which can have varying degrees of trust. Data centers may have a range of inherent control of resources, from a highly secure environment of military, government, and Fortune-100 corporations, to relatively medium or low levels of security in colleges and schools, to very relaxed environments. Various data centers can have varying degrees of camera and electronic surveillance.

A threat model for a home personal computer can presume that memory is not included in the perimeter since memory is classically upgraded. To a first order, the perimeter can contain the processor and in some systems can also include a network interface. Thus, a suitable security perimeter can comprise the processor which can be made physically secure and tamper-evident. Data (all information passing the security boundary) leaving the processor can be encrypted. Network traffic can be encrypted since only a moderate bandwidth is consumed and performance is not impacted.

However, cache-memory traffic is substantial and memory is highly latency-sensitive so adding cycles reduces performance. Encrypting memory is somewhat burdensome but becomes very substantial when cache is encrypted. Accordingly, performance can be greatly improved by encrypting internally to memory subsystem hierarchy, for example through usage of a smart memory module. In an illustrative embodiment, faster main memory RAM can be placed within a security perimeter and slower non-volatile memory positioned outside the perimeter with memory data transfers between RAM and non-volatile (NV) memory (or NV memory cache) encrypted. Another example embodiment can include memory and Phase Change Memory (PCM) interfaces wherein a security perimeter can enclose the memory and only traffic that flows between the memory and the PCM cache can be encrypted. Accordingly, data is encrypted between the memory and PCM (non-volatile RAM).

In current systems, memory is generally not integrated with memory. In future systems, such integration is possible with some accommodation between distinctions between processor and memory silicon processing technology, circuit speed, and circuit optimization. Positioning of the security perimeter can take into consideration such processor/memory integration, for example by forming a perimeter enclosing the processor/memory integrated circuit and encrypting data passing between the integrated circuit and outside memory and other components and devices.

One example of a tamper-resistant apparatus can be a Faraday cage that allows no radio frequency signal to pass and which can have sensor connections indicative of electrical characteristics internal to the cage. A short circuit can perform intrusion detection, indicating an attack and that trust is broken. Some embodiments of a tamper-resistant apparatus can include control logic operable to erase stored information before unauthorized reading is possible.

Another example tamper-handling method and apparatus can address attacks based on remanence or remanent magnetization, a phenomenon wherein magnetization is left behind in a permanent magnet after an external magnetic field is removed. Thus, the magnetic field of memory chips can be detected and analyzed by spraying the memory chips with liquid nitrogen and moving the chips to another computer to enable reading of the remanent information. Encrypted information in the memory can be accessed along with cryptographic keys to enable access. Accordingly, information on a lost laptop or cell phone can be accessed despite cryptographic security. A tamper-handling device can be included in a security perimeter to give some protection against physical intrusion.

In some configurations, the security perimeter can be implemented purely using logic, such as operating fully in software. In other configurations, the security perimeter can take other forms such as partly using logic and partly using other techniques for devices. Sometimes the security perimeter can be associated with tamper-evident mechanisms. For example, one technique for implementing tamper-handling can be a device that analyzes integrated circuit chip temperature to determine whether a liquid nitrogen freeze has been applied to the chip. The technique enables detection of an attack but does not prevent the attack. An illustrative tamper resistant mechanism can monitor temperature and, upon detecting a notable reduction in temperature, erase the data before unauthorized reading or other manipulation. Other tamper resistant or tamper evident mechanisms can be used.

A hardware perimeter can be configured around memory, which can be a very large perimeter, for example in the case of a data center which includes a vast amount of memory and other storage.

An example embodiment of a security perimeter can be implemented in a data center. Computer system elements can include blades—modules plugged into a server. A typical blade has a central processing unit (CPU) or processor, disks, memory, and the like. The blade forms a convenient package which can be enclosed in metal with a tamper-resistant mechanism attached to enable, in response to a security break, self-destruction of the blade, for example by exposing to acid, to erase any readable data. The tamper-resistant mechanism can be combined with cryptographic security in which data flowing across a blade boundary can be encrypted, thus forming a security perimeter for a whole blade.

Some data centers are composed of computers which include memory but do not include disk storage. The disks are housed elsewhere. A security perimeter can be retracted to enclose processors and memory systems with storage on a disk external to the security perimeter so that data flowing to and from the disk is encrypted. The security perimeter can be further retracted to enclose processors and processor caches but not around dynamic RAM (DRAM) of the memory systems and not around the disks so that information flowing from cache to memory is encrypted and decrypted, but data flowing between the processor and cache is not cryptographically processed to avoid computation penalty for a cache miss.

An embodiment of a system can support a security perimeter using a smart memory module. An example configuration can include a processor and a smart memory module—a hybrid memory cube which includes logic and multiple DRAM devices, and typical devices and components that make up the computer system. The smart memory module can be used to enable a security perimeter enclosing the processor wherein the memory is outside the perimeter and information passing from the processor in memory, for example DRAM, is encrypted.

The smart memory module enables receipt of encrypted information from a processor and decryption local to the memory module. The communication channel between the processor and the memory module can be encrypted using channel encryption. Channel encryption between the processor and the smart memory module enables stronger and more efficient encryption than is possible with storage encryption.

In contrast, in a system using a convention memory module with no or limited processing logic all encryption and decryption can only be executed by the processor, which is inefficient and costly, using relatively expensive storage code.

In other configurations, the smart perimeter can be positioned within the smart memory module. For example, a memory subsystem can be formed to include DRAM and a large amount of nonvolatile memory such as flash or phase change memory (PCM). The DRAM can function as a cache for the PCM or nonvolatile memory. Accordingly, channel encryption can be used between the processor and logic interface device in the smart memory module. The logic interface device can decrypt the information encrypted by the processor and sent over the channel and store the decrypted information in the DRAM, then can use storage encryption when passing the information from the DRAM to the PCM or nonvolatile memory. A corresponding tamper-handling perimeter can be combined with such a cryptographic perimeter. Thus, for example, a small tamper-evident module such as a single-chip can be positioned in the location of the cryptographic perimeter. Furthermore, the tamper-evident and security perimeter can be retracted just to the logic interface device where channel encryption can be used between the processor and the logic interface device inside the smart memory module. The smart memory module can be used to decrypt some of the data or store the data in a partially-encrypted form. For example, some but not all of the channel encryption can be stripped, and then selected memory randomization techniques and obfuscation or crypto-obfuscation techniques applied. Thus, a medium level of encryption can be applied to information in the logic interface device in comparison to the stronger encryption to the data stored in the DRAM which is outside the logic interface device and outside the cryptographic perimeter of the logic interface device. The logic interface device can store a selected amount of key information that can be decrypted and map requests from devices such as disks, disk drives, and the like. The logic interface device can randomize the addresses involved in storage encryption, which is difficult to achieve with a memory without logic support. In contrast, a smart memory module including the logic interface device can randomize addresses so that even with relatively weak storage encryption can attain sufficient security to store even the most sensitive information within the cryptographic and tamper-proof perimeter of the logic interface device.

In an example system with non-volatile RAM, putting fast memory inside the perimeter and non-volatile RAM outside the perimeter is a compromise to hybrid memory. Design considerations that may be taken into account include: 1) constructing the perimeter around the memory is costly and difficult, and 2) placing sufficient memory in the processor chip stack can result in fewer memory constraints in the chip stack with non-volatile RAM positioned outside the perimeter. In one suitable hybrid configuration, volatile memory can be positioned inside the perimeter with non-volatile memory outside.

Fine-Grained Security

Encrypted or smart memory can be configured to support fine-grained security. Security in existing networks, systems, and computers is coarse-grained due to large granularity of native code, for example imposed by the 4 kilobyte (kb) size of a virtual memory page. Security is sought in an environment characterized by running of applications that share data with other entities. Security is coarse-grained in that memory blocks can be individually protected. For binary code or machine code, the 4 kb granularity encompasses a large amount of data in comparison to the typical 10 or 12-bit size of machine code words for which individual protection may be sought.

Another security technique can be to assign data to a particular virtual machine, which is even more coarse-grained. For example, if security is sought in the context of a browser not known to be secure, the browser can be assigned a virtual machine that runs only the browser. A virtual machine can encompass more than a CPU alone and include other components and devices such as motherboard I/O devices. The virtual machine thus can be much larger than the 4 kb granularity of memory blocks.

Security can also be sought in software or interpretive environments, for example using Java byte code or C-sharp byte code, which can be more fine-grained but at the cost of much slower performance. An interpreter can support any protection desired, even down to individual bits but is much slower than the machine code level. Performance can be accelerated only by more coarse-grained checking.

What is desired is fine-grained security with suitable speed performance. Fine-grained security is directed toward protecting memory in fine-grained pieces.

Fine-grained security can support resource allocation and resource scheduling, and can be supporting technology for hardware scheduling, virtual memory. Fine-grained security facilitates, for example, for running applications on a computer controlled and owned by another entity.

Various techniques can be used to identify the memory items to be protected including pointers such as a pointer to an object or metadata associated with a pointer, offsets, addresses, and the like.

An example fine-grained security paradigm can use metadata associated with a pointer that identifies a lower bound, and upper bound, and permissions. The pointer can be enabled to point to particular objects or even to any position within an object. Metadata can specify permissions including memory locations to which data can be written, when program code is allowed to execute, how long writing is allowed, and the like. Permissions can be associated with data objects, for example assigning a pointer to an object and, using permissions, allowing only methods belonging to that object to access the object. Another example of permissions can enable access to data, but only for specified purposes, for instance to enable a first running of an object and access allowed to only part of a routine, while preventing access by others. In another example, a particular method can be permitted to run a limited number of times or just one time, and can prevent subsequent access to data when the data has been previously exposed to an authorized reader.

Permissions can implement a concept of poisoning. For example, a user can enter a name into a text field and mark a poisoned bit that prevents subsequent branching or subroutine return. The poisoned bit can function as a dirty bit which indicates whether an item such as an object, memory, or other resource is dirty, which prevents predetermined purposes or actions to the item, for example preventing actions applied to a data block or object, such as not allowing return.

An illustrative computer system can be configured with smart memory or encrypted memory for fine-grained security as supporting infrastructure in a concept of federated sharing and federated data sets. Sensor fusion involves fusing of data and data sets in numerical aspects and permissions aspects, wherein data and data sets are fused in conditions of a first entity owning or controlling a first sensor and a second entity a second sensor.

Fine-grained security can be implemented in an infrastructure can be implemented in an architecture including servers and clients. For example, gaming code servers and gaming console clients can interact by running program code that executes in part on machines controlled by the server and in part on machines controlled by the client. Fine-grained security enables the interaction to be mutually trusted by both sides.

Fine-grained security can be configured to exploit existing infrastructure aspects such as the Trusted Platform Module (TPM) which is installed in computer systems somewhat universally but little used in practice. TPM generally includes secure storage for keys little or no security logic.

In some embodiments, a servers and clients architecture can implement fine-grained security using one or more server downloaded modules. For example, a gaming code server can transfer a server downloaded module that executes on a client wherein the client's user software and operating system is not able to read associated TPM keys. Fine-grained security can be configured to prevent the client or user operating system from reading the TPM keys, for example to ensure isolation in software, and further configured to prevent physical attacks for example via a device such as a logic analyzer on the bus reading sensitive information.

Some system embodiments which support fine-grained security can be activated at boot-strap loading of a computer, for example via microcode executing in the processor. A further aspect of fine-grained security can include physical security of the TPM, for example through use of tamper-evident/resistant packaging. At boot-strap loading, TPM can perform various security operations such as inspecting software version and possibly microcode, ensuring viability of software, for example by creating and applying a hash to each level of code (microcode, firmware, software, and the like), checking against previously run code, signing-off on viability if warranted, and printing a signature of executing code to enable determination of trust.

Fine-grained security operations can further include building or creating a chain of trust, checking each part of operation beginning with TPM, then checking security during operating system functions, downloading of modules, and execution of procedures. In an example configuration, fine-grained security can perform checks of operation system functions which, to the first order, control all operations.

An example of chain of trust can begin with trust of an operating system (for example by an association such as Motion Picture Association of America (MPAA), International Game Developers Association (IGDA), and the like). If the operating system is certified and fine-grained security operable under the certified operating system ensures that the system is not hacked, the chain of trust is established since the operating system prevents user code from accessing downloadable code.

Weaknesses of the chain of trust can be that the process is too linear and easy to break since a single-point of failure breaks trust. Chain of trust also has problems ensuring privacy.

An extension that can improve chain of trust is a late-secure boot which is run later than a typical bootstrap load and can involve security checking in an operating system that is not yet trusted. At running of the late-secure boot, a security initialization is run which starts security process booting in a system that is already running.

A more secure concept of security can be a web of trust. The web of trust can have multiple trust levels which hand trust to the operating system. At each trust level, software can validate code in a stack of code to establish trust. In the web of trust, a failure at some point can be rechecked according to a byzantine path which forms a set of protocols to establish trust. The operating system can use pathfinding or agglomerated trust protocols to analyze trust at each level to enable multiple levels or types of trust validation.

Figure 1B:
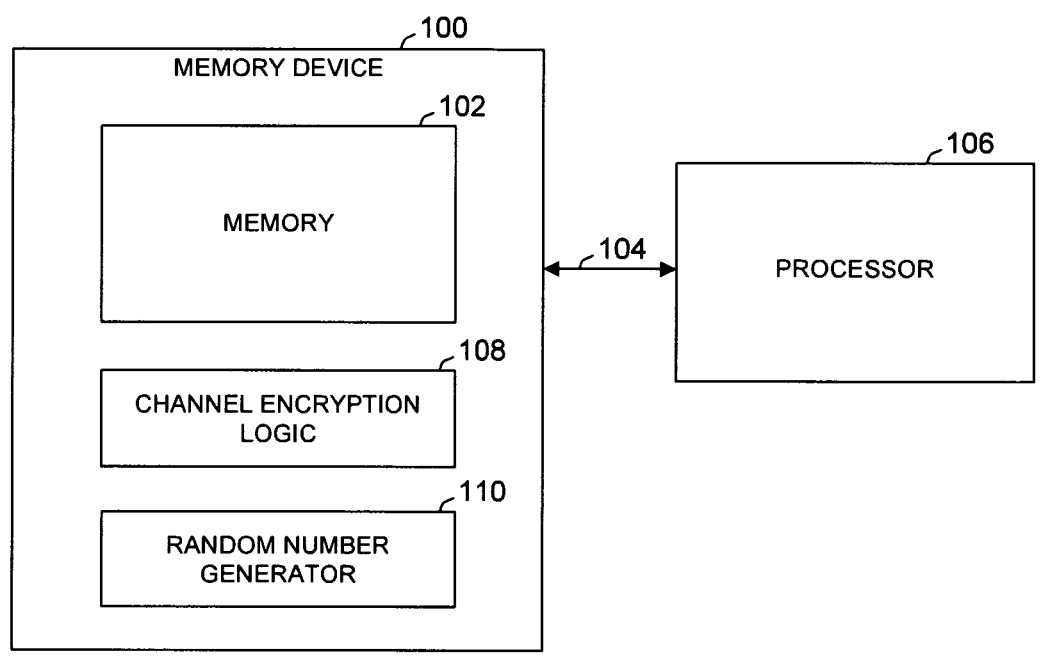
Figure 1C:
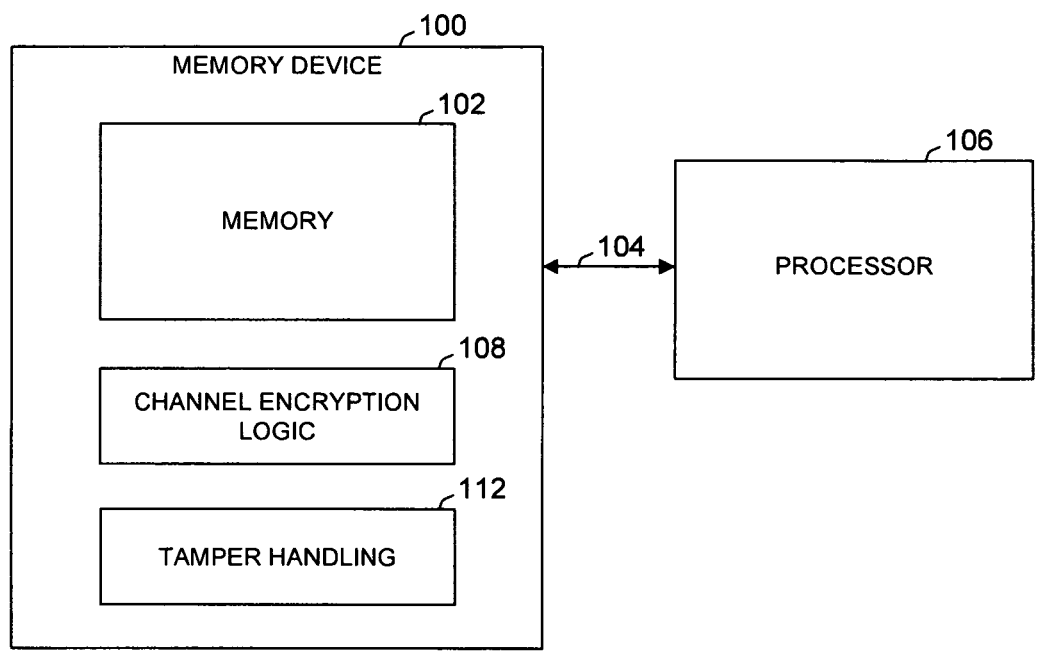

Referring to FIGS. 1A, 1B, and 1C, schematic block diagrams depict embodiments of a memory device 100 operable to perform channel encryption which, as distinguished from storage encryption, involves communication between devices, each of which includes cryptographic logic and performs cryptographic operations. In an illustrative embodiment, the memory device 100 can comprise a memory 102 operable to store data communicated via a communication channel 104 from a processor 106, and logic 108 operable to perform channel encryption operations on the communication channel 104 that communicates information between the processor 106 and the memory 102.

Generally, the logic 108 operable to perform channel encryption operations is operable to decrypt information that is encrypted by the processor 106 and received over the communication channel 104.

In some embodiments, the logic 108 operable to perform channel encryption operations is operable to decrypt both address and data information encrypted by the processor 106 and store data at the decrypted address. Thus, in channel encryption both address and data information can be encrypted into an encrypted value. A different encrypted value can be read back as the encryption state advances. Thus in channel encryption, a different encryption value can be returned in comparison to that written out.

The logic 108 operable to perform channel encryption operations can be configured to partially decrypt information encrypted by the processor 106. Thus, the memory device 100 can be used to decrypt some of the data or store the data in a partially-encrypted form. Some of the channel encryption can be stripped, and selected memory randomization techniques applied, enabling multiple levels of encryption for storing information of varying sensitivity.

In some arrangements, shown in FIG. 1B, a pseudo-random number generator 110 can be coupled to the memory 102 and coupled to the logic 108 operable to perform channel encryption operations. The pseudo-random number generator 110 can be operable to generate numbers for usage in encrypting information on the communication channel 104. Thus, an example channel encryption technique can use a starting random number and communicate the random number between the processor 106 and the memory 102. The random number can drive the pseudo-random number generator 110. The processor 106, the memory 102, or both can periodically create new random numbers using the pseudo-random number generator 110 which can be integrated onto the memory 102.

In some embodiments, the memory device 100 can support a one-time pad encryption technique in which each bit or character of plaintext is encrypted by a modulation addition with a bit or character from a secret random pad or key of the same length as the plaintext, resulting in a ciphertext. Thus, the logic 108 operable to perform channel encryption operations can be operable to perform stream encryption of information communicated on the communication channel 104 wherein processor and memory sides of the communication channel 104 are assigned a key.

The memory device 100 can be constituted to support either single-ended channel encryption in which data can be sent from the processor 106 to the memory 102 over the communication channel 104, or bidirectional in which the processor 106 sends data to the memory 102 and the memory 102 sends the data back to the processor 106 over the communication channel 104, or both. Possibilities for improving channel encryption are most available for bidirectional interchange, such as by continually generating new random numbers and changing encryption parameters dynamically. Thus, the logic 108 operable to perform channel encryption operations can be operable to perform channel encryption operations on the communication channel 104 for information that is storage encrypted wherein the storage-encrypted information is encrypted by the processor 106, stored in the memory 102, accessed from the memory 102, and decrypted by the processor 106.

Referring to FIG. 1C, the memory device 100 can be used in a system that implements the concept of a security perimeter which combines cryptographic and physical security. Accordingly, in some embodiments, cryptographic security can be combined with physical security in the form of a tamper-handling device 112 coupled to the memory 102 and operable to handle physical intrusion to the memory 102.

The tamper-handling device 112 can be operable to perform at least one operation of tamper-proofing, tamper-resistance, and tamper-evidence.

In some arrangements, a system can include multiple security perimeters. Thus in some embodiments the memory device 100 can be used wherein the logic 108 operable to perform channel encryption operations and the tamper-handling device 112 are operable to form at least one cryptographic and tamper-handling security perimeter enclosing at least one selected region of the memory 102. The security perimeters can be separate or nested, for example to include perimeters of varying strength of encryption.

Combining the memory device 100 with logic 108 operable to perform channel encryption operations can enable time-varying encryption. Data is written to an address which, when read back, is different, but no information is lost since the reading the processor 106 at the opposite side of the communication channel 104 from the memory device 100 has sufficient intelligence capability to strip off the encryption.

Figure 2A:
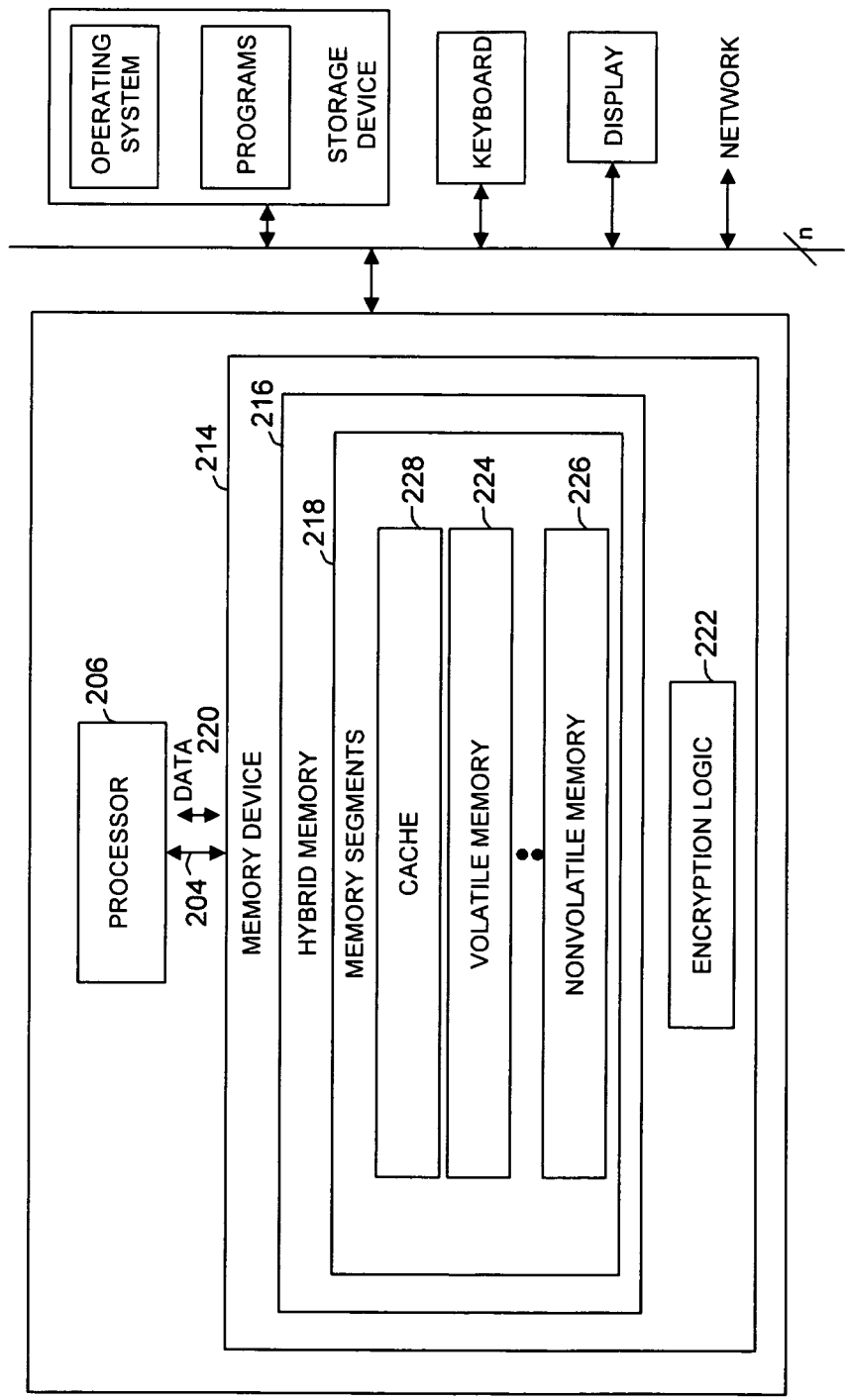
FIGS. 2A, 2B, and 2C are schematic block diagrams showing embodiments of memory devices including hybrid memory constituted to facilitate security capabilities.
Figure 2B:
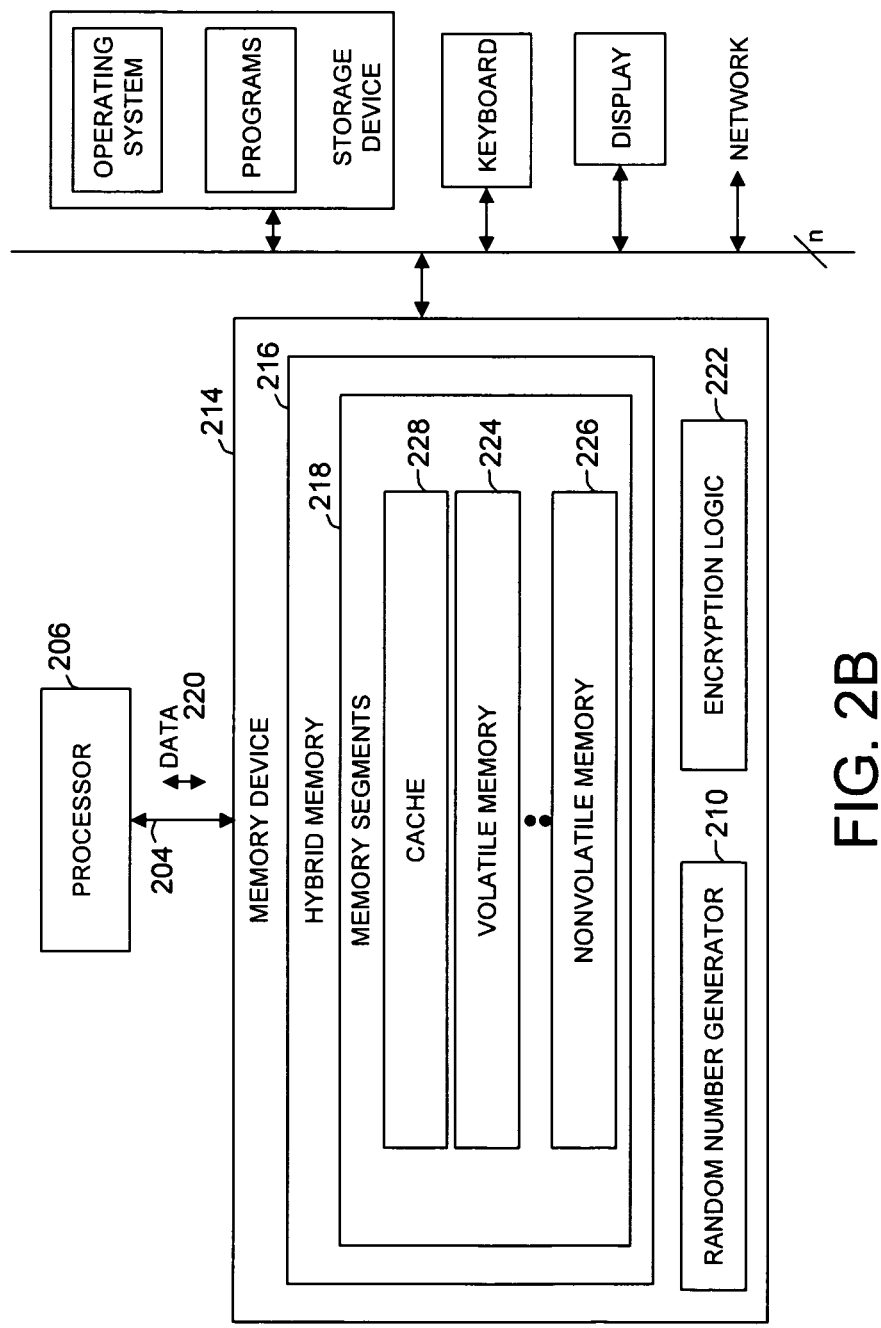
Figure 2C:
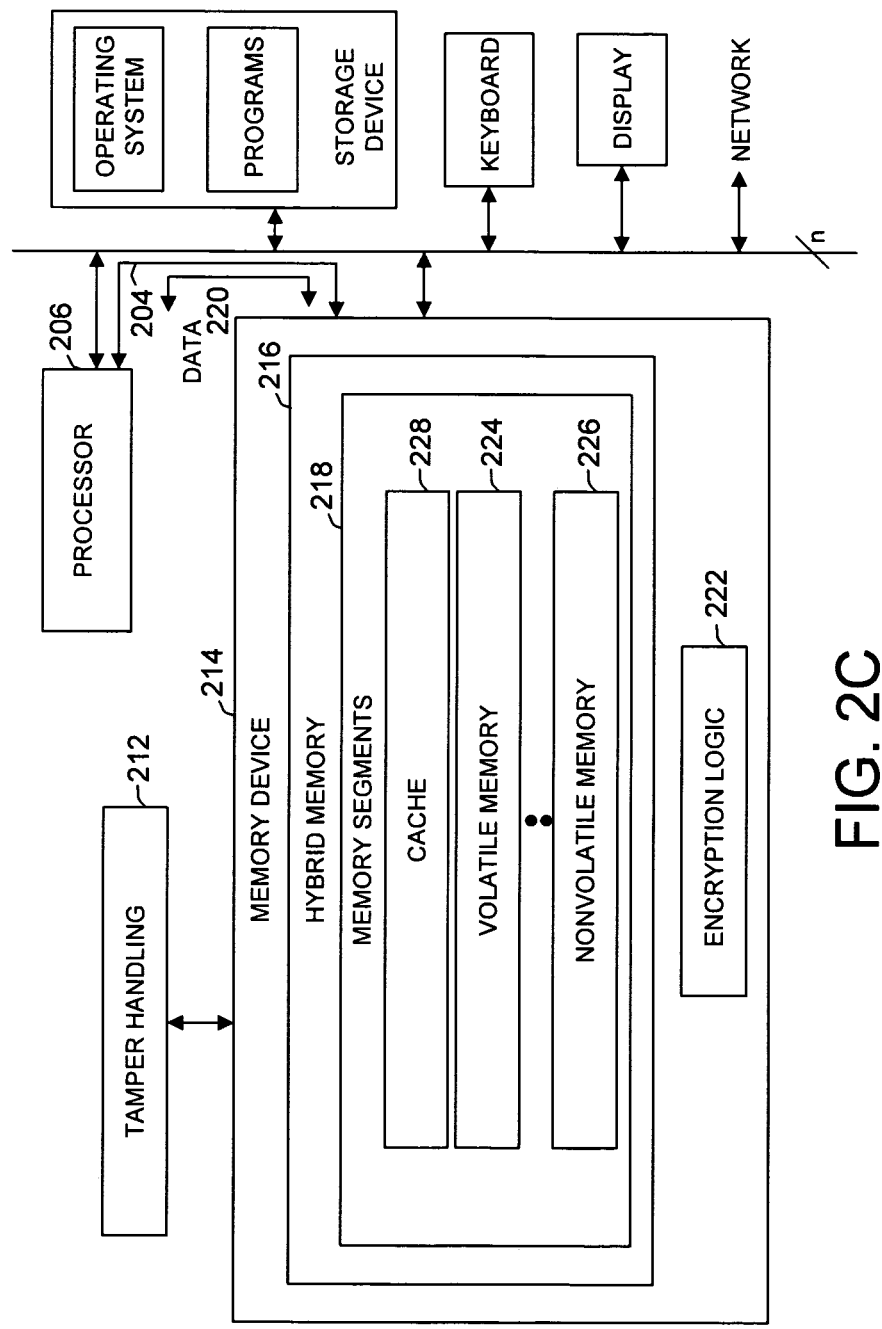

A security perimeter can be formed using a smart memory module, for example in a configuration including a processor that interacts with a smart memory module. The smart memory module can include a hybrid memory cube, for example with logic and multiple memory devices, and various devices and components that make up the computer system. Accordingly, referring to FIGS. 2A, 2B, and 2C schematic block diagrams show embodiments of memory devices including hybrid memory constituted to facilitate security capabilities. A memory device 214 can comprise a hybrid memory 216 comprising a plurality of memory segments 218 characterized by a plurality of operating characteristics. The hybrid memory 216 can be operable to store data 220 communicated from a processor 206. The memory device 214 can further comprise logic 222 operable to perform encryption operations on the data 220 during transfers between ones of the plurality of memory segments 218.

In some embodiments, the memory device 214 can be constituted wherein the logic 222 operable to perform encryption operations is operable to perform encryption operations on the data 220 during transfers between the processor 206 and the plurality of memory segments 218.

The plurality of memory segments 218 can be arranged to include various types of memory with different characteristics and speeds, for example the plurality of memory segments 218 can comprise volatile main memory 224, nonvolatile main memory 226, or a combination of memory types.

In particular embodiments, the plurality of memory segments 218 can constitute a volatile main memory 224 and a nonvolatile main memory 226 wherein the volatile main memory 224 has faster operating characteristics than the nonvolatile main memory 226. For example, the plurality of memory segments 218 can be formed in memory subsystem combining DRAM and a large amount of nonvolatile memory such as flash or phase change memory (PCM).

In some memory device 214 embodiments, the plurality of memory segments 218 can include a cache 228. In an example embodiment, DRAM can operate as a cache 228 for the PCM or nonvolatile memory, facilitating channel encryption between the processor 206 and the memory device 214. The logic 222 operable to perform encryption operations can decrypt the information encrypted by the processor 206 and sent over the channel and store the decrypted information in the DRAM, then can use storage encryption when passing the information from the DRAM to the PCM or nonvolatile memory 226.

Various embodiments of the memory device 214 can be configured for channel encryption. For instance, the logic 222 operable to perform encryption operations can function to encrypt data 220 on a communication channel 204 that communicates information between the processor 206 and the hybrid memory 216.

The memory device 214 can be configured to perform one or more of several channel encryption operations in cooperation with a processor 206. For instance, the logic 222 operable to perform encryption operations can operable to decrypt information encrypted by the processor 206. In some embodiments and/or conditions, the logic 222 operable to perform encryption operations is operable to decrypt address and data information encrypted by the processor 206 and store data at the address in the hybrid memory 216. Similarly, the memory device 214 can be configured wherein the logic 222 operable to perform encryption operations is operable to partially decrypt information encrypted by the processor 206.

Some embodiments of the memory device 214 can include a random number generator, for example which can be closely associated to and integrated onto the memory device 214 chip. Accordingly, a pseudo-random number generator 210 coupled to the hybrid memory 216 and coupled to the logic 222 operable to perform encryption operations. The pseudo-random number generator 210 can be operable to generate numbers for usage in encrypting information.

The memory device 214 can be configured to implement one or more of a variety of security schemes including channel encryption, storage encryption, RSA (Rivest, Shamir, Adleman) cryptography and key distribution, Public Key Infrastructure (PKI). Accordingly, the logic 222 operable to perform encryption operations can be operable to perform stream encryption of communicated information wherein processor and memory sides are assigned a key. In another example functionality, the logic 222 operable to perform encryption operations can be operable to encrypt information that is storage encrypted wherein the storage-encrypted information is encrypted by the processor 206, stored in the hybrid memory 216, accessed from the hybrid memory 216, and decrypted by the processor 206.

Some embodiments of the memory device 214 can be configured to support a cryptographic and/or tamper-handling (tamper-evident, tamper-resistant, and the like) perimeter. The memory device 214 can thus further comprise a tamper-handling device 212 coupled to the hybrid memory 216 which is operable to handle physical intrusion to the hybrid memory 216. The tamper-handling device 212 can be operable to perform at least one operation of tamper-proofing, tamper-resistance, and tamper-evidence. The logic 222 operable to perform encryption operations and the tamper-handling device 212 can be operable in combination to form at least one cryptographic and tamper-handling security perimeter enclosing at least one selected region of the hybrid memory 216.

In a particular applications and/or arrangements, the security perimeter can be formed within the memory device 214 and, for example, enclose the entire memory device 214, between dynamic random access memory (DRAM) and the memory device 214, between non-volatile random access memory (RAM) and the memory device 214, or any other suitable position. The cryptographic and/or tamper-handling perimeter can further be generalized for positioning between a smaller amount of memory and a larger amount of memory in the memory device 214. Some embodiments can include a cryptographic perimeter in the absence of a tamper-handling perimeter.

In some embodiments, the logic 222 operable to perform encryption operations can be operable to perform time-varying encryption. For example, channel encryption assisted by the memory device 214 can enable randomization of encrypted information wherein encrypted data is read back and encryption can be stripped off by the receiving processor 206. The memory device 214 with logic or other smart component can enable time-varying encryption. Data can be written to an address which, when read back, is different, but no information is lost since the reading processor 206 or other reading device at the opposite side of the channel from the smart memory has sufficient intelligence capability to strip off the encryption.

Figure 3A:
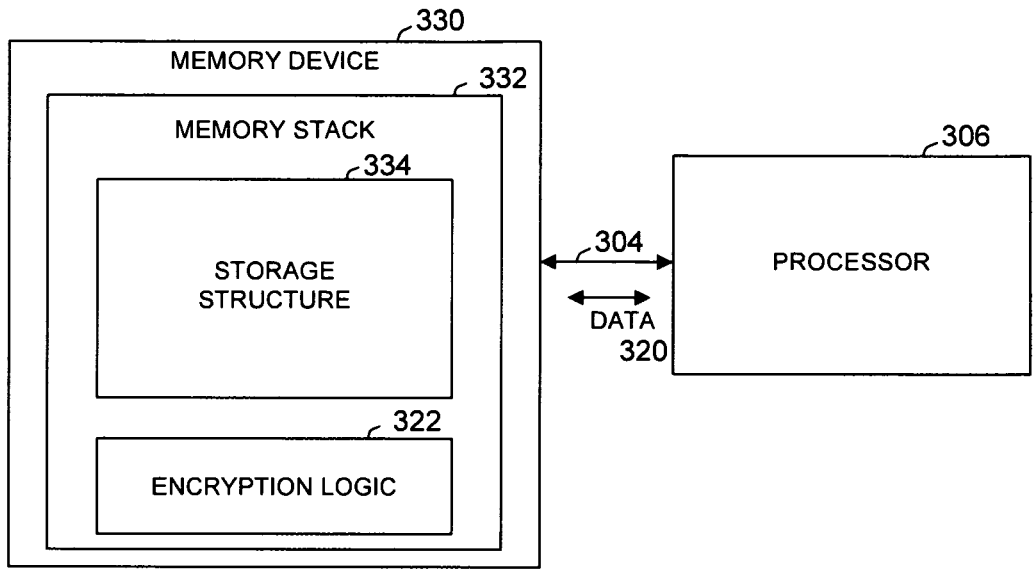
FIGS. 3A and 3B are a schematic block diagram and a side pictorial view illustrating an embodiment of a memory device that makes use of a memory stack to facilitate enable security capabilities, including cryptographic security.
Figure 3B:
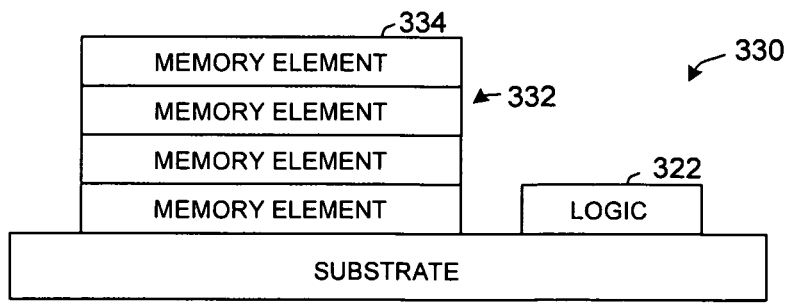

Referring to FIGS. 3A and 3B, a schematic block diagram and a side pictorial view illustrate an embodiment of a memory device 330 that makes use of a memory stack 332 to facilitate enable security capabilities, including cryptographic security. In an illustrative embodiment, the memory device 330 can comprise a memory stack 332 operable to store data 320 communicated from a processor 306. The memory stack 332 can comprise a storage structure 334 and logic 322 operable to perform encryption operations. The storage structure 334 is operable to store data 320 communicated via a communication channel 304 from the processor 306. The logic 322 is operable to perform encryption operations on the data 320 during transfers between the processor 306 and the storage structure 334.

The memory device 330 can be constituted to facilitate channel encryption through operation of the logic 322 operable to perform encryption operations. Accordingly, the logic 322 operable to perform encryption operations can be operable to perform channel encryption operations on a communication channel 304 that communicates information between the processor 306 and the memory stack 332. Channel encryption can improve performance and economy in various applications and conditions in comparison to expensive storage encryption. The logic 322 operable to perform encryption operations can facilitate good memory encryption, for example between the processor 306 and the memory stack 332. An illustrative configuration can include a CPU that interacts with the memory stack 332 comprising multiple DRAM chips and the logic 322 operable to perform encryption operations integrated into a logic chip operable to perform strong channel encryption between the CPU and the memory stack 332.

In various embodiments, the memory device 330, the memory stack 332, and the logic 322 operable to perform encryption operations can be constituted to perform one or more of several security operations. For example, the logic 322 operable to perform encryption operations is operable to decrypt information encrypted by the processor 306. Similarly, the logic 322 operable to perform encryption operations is operable to partially decrypt information encrypted by the processor 306. The logic 322 can also be operable to perform encryption operations is operable to perform stream encryption of information communicated on a communication channel 304 wherein processor and memory sides of the communication channel 304 are assigned a key. In an embodiment or circumstances where security can be best attained by using a combination of storage encryption and channel encryption, the logic 322 operable to perform encryption operations is operable to perform channel encryption operations on a communication channel 304 for information that is storage encrypted wherein the storage-encrypted information is encrypted by the processor 306, stored in the memory stack 332, accessed from the memory stack 332, and decrypted by the processor 306. The logic 322 operable to perform encryption operations can also be operable to perform time-varying encryption.

Information can be stored in the memory stack 332 unencrypted or the logic 322 can encrypt the data for storage. Thus, channel encryption can be performed between the CPU and a logic chip, enabling cryptographic security without requiring storage encryption of data stored in the logic chip.

Figure 4:
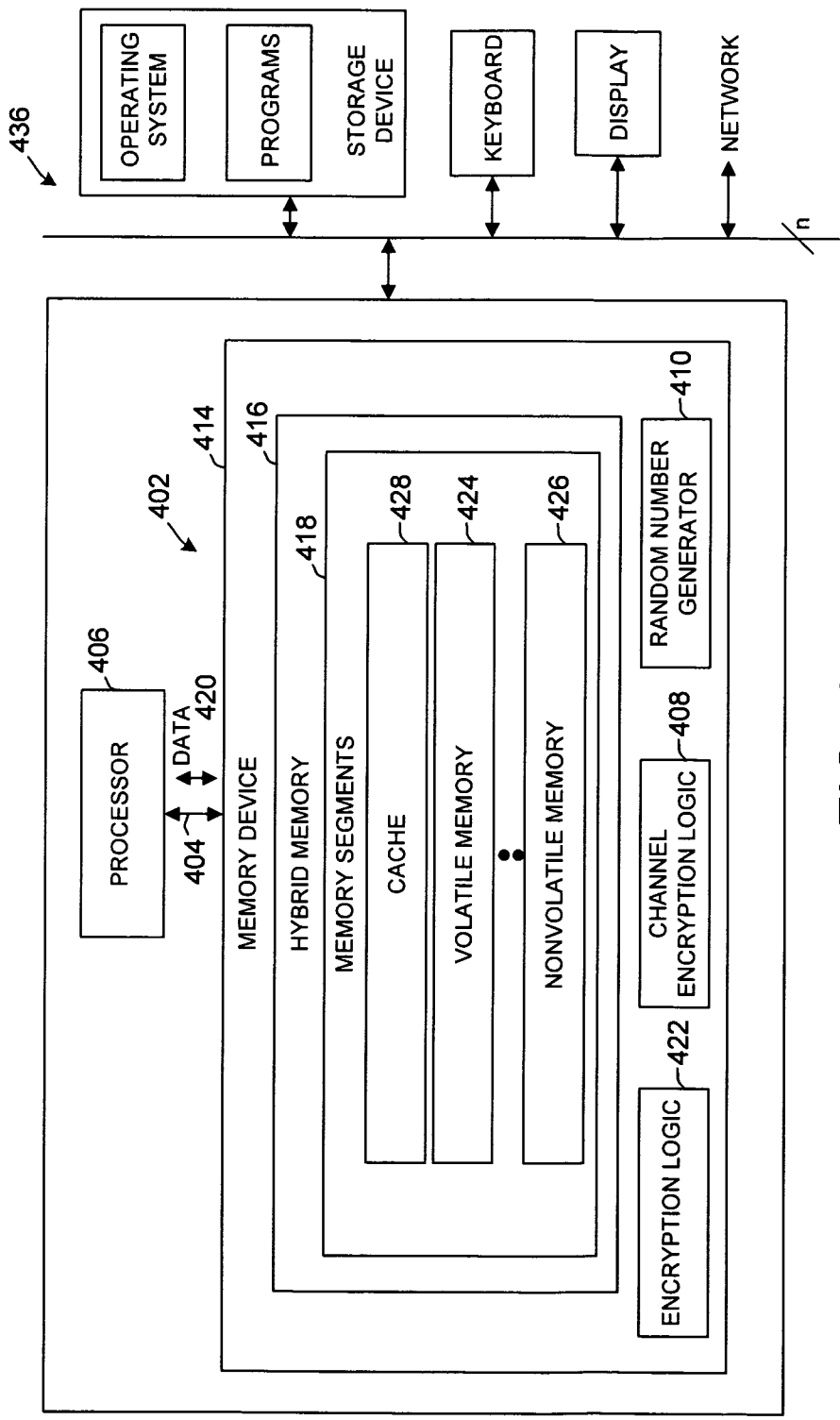
FIG. 4 is a schematic block diagram showing an embodiment of a computer system that can be configured to include one or more of several operational aspects that facilitate security.

Referring to FIG. 4, a schematic block diagram illustrates an embodiment of a computer system 436 that can be configured to include one or more of several operational aspects that facilitate security. A computer system 436 can comprise a processor 406 and a memory device 414 communicatively coupled to the processor 406. The memory device 414 can comprise a memory 402 operable to store information communicated via a communication channel 404 from the processor 406; and logic 408 operable to perform channel encryption operations on the communication channel 404 that communicates information between the processor 406 and the memory 402.

Channel encryption can be performed using two intercommunicating smart devices, for example one of which is the processor 406 and the other the memory device 414 via the associated logic 408 operable to perform channel encryption operations. For channel encryption, a sending device such as the processor 406 need not specify a storage address for storing transmitted data to the receiving storage device. Instead, a stream of commands can be transmitted which contain a mixture of address and data information. Accordingly, the computer system 436 can be configured wherein the logic 408 operable to perform channel encryption operations is operable to decrypt information encrypted by the processor 406. In some embodiments, the logic 408 operable to perform channel encryption operations is operable to decrypt address and data information encrypted by the processor 406 and store data at the address.

In some embodiments, the logic 408 operable to perform channel encryption operations is operable to partially decrypt information encrypted by the processor 406. For example, the memory device 414 can decrypt some of the data or store the data in a partially-encrypted form to attain a medium level of encryption.

The logic 408 operable to perform channel encryption operations can be closed associated or integrated onto the memory device 414. In some embodiments, integration of the memory device 414 onto a single integrated circuit chip can include not only the memory 402, but also the logic 408 operable to perform channel encryption operations, and a pseudo-random number generator 410. Thus, the pseudo-random number generator 410 can be integrated to the memory device 414 and coupled to the logic 408 operable to perform channel encryption operations. The pseudo-random number generator 410 can generate numbers for usage in encrypting information on the communication channel 404.

In some embodiments, the memory device 414 can be formed wherein the logic 408 operable to perform channel encryption operations is operable to perform stream encryption of information communicated on the communication channel 404 wherein processor and memory sides of the communication channel 404 are assigned a key. Thus, channel encryption can operate wherein both sides of the channel have a key and use stream encryption, using any desired form of stream encryption ranging from full public key encryption to pseudo-random generator techniques, to more simple streaming ciphers.

In some implementations of the memory device 414, the logic 408 operable to perform channel encryption operations is operable to perform time-varying encryption, thus attaining a higher degree of security. Channel encryption thus improves security by creating a lack of predictability from the perspective of a snooper or attacker.

Embodiments of the computer system 436 can be used for cryptographic security with a combination of channel encryption and storage encryption. For example, the logic 408 operable to perform channel encryption operations is operable to perform channel encryption operations on the communication channel 404 for information that is storage encrypted wherein the storage-encrypted information is encrypted by the processor 406, stored in the memory 402, accessed from the memory 402, and decrypted by the processor 406.

In some embodiments, the memory device 414 can comprise a hybrid memory 416 made up of a plurality of memory segments 418 characterized by a plurality of operating characteristics which may be similar or different. The hybrid memory 416 can be operable to store data communicated from a processor 406.

The memory device 414 can be configured to include logic 422 operable to perform encryption operations on the data 420 during transfers between ones of the plurality of memory segments 418.

The memory device 414 can further be configured wherein the logic 422 operable to perform encryption operations is operable to perform encryption operations on the data during transfers between processor 406 and the plurality of memory segments 418.

The computer system 436, memory device 414, and hybrid memory 416 can be constituted with a variety of memory configurations, for example comprising one or more of the plurality of memory segments 418 including volatile main memory 424, the plurality of memory segments 418 including nonvolatile main memory 426, the plurality of memory segments 418 including a volatile main memory 424 and a nonvolatile main memory 426 wherein the volatile main memory 424 has faster operating characteristics than the nonvolatile main memory 426, the plurality of memory segments 418 includes a cache 428, a combination of memory types, or the like.

Referring to FIGS. 5A through 5M, schematic flow charts illustrate an embodiment or embodiments of a method for to performing channel encryption which, as distinguished from storage encryption, involves communication between devices, each of which includes cryptographic logic and performs cryptographic operations.

As shown in FIG. 5A, an embodiment of a method 500 for storing data in a memory device comprises communicating 501 data between a processor and a memory via a communication channel, performing 502 channel encryption operations on the communication channel that communicates information between the processor and the memory, and storing 503 the communicated data in the memory.

Figure 5F:
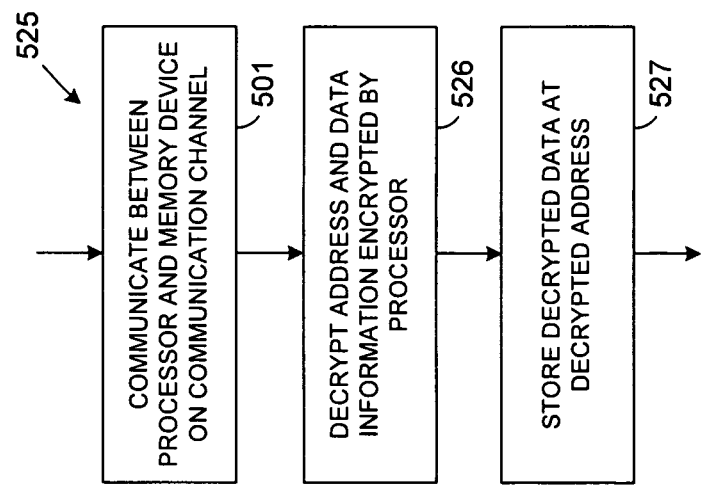
Figure 5E:
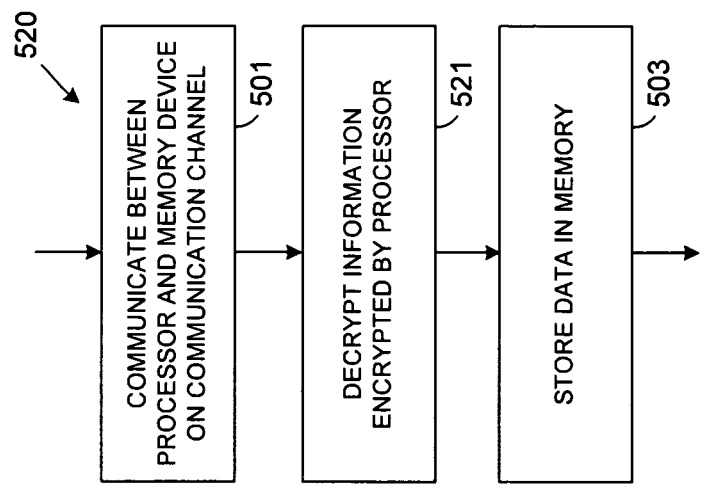
Figure 5D:
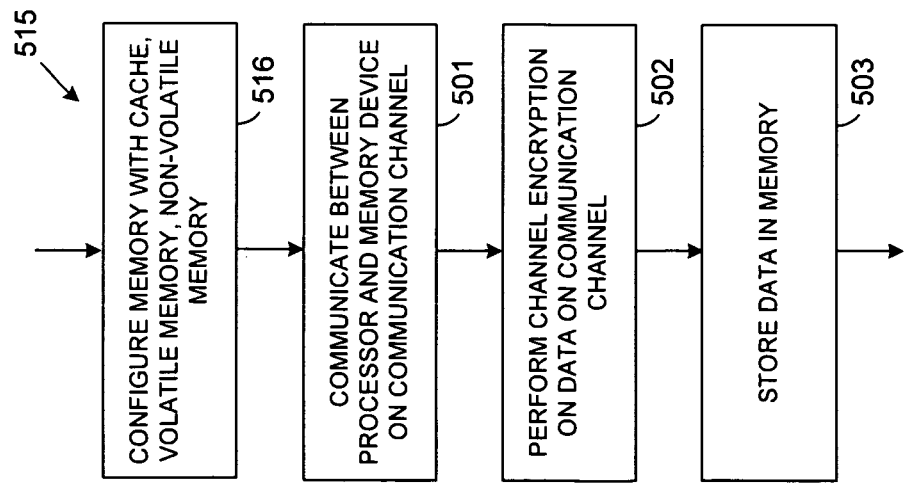

FIGS. 5B through 5D depict several aspects of channel encryption. For example, as shown in FIG. 5B, a channel encryption method 505 can further comprise storing 506 the communicated data in a hybrid memory comprising a plurality of memory segments characterized by a plurality of operating characteristics, and performing 507 encryption operations on the data during transfers between ones of the plurality of memory segments.

Referring to FIG. 5C, an encryption method 510 can comprise performing 511 encryption operations on the data during transfers between processor and the plurality of memory segments.

As depicted in FIG. 5D, a security method 515 can be configured wherein the plurality of memory segments can be in a configuration 516 selected from one or more of cache, nonvolatile main memory, volatile main memory, and a combination of volatile main memory and nonvolatile main memory wherein the volatile main memory has faster operating characteristics than the nonvolatile main memory.

Figure 5I:
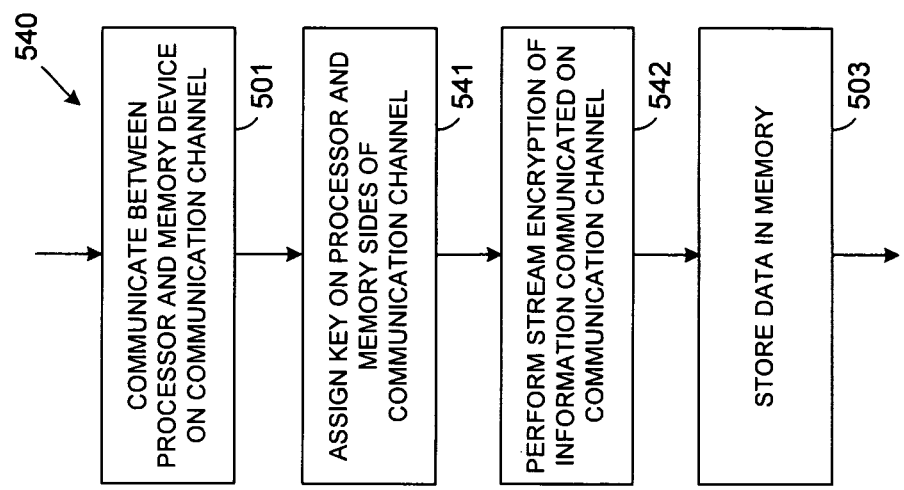
Figure 5H:
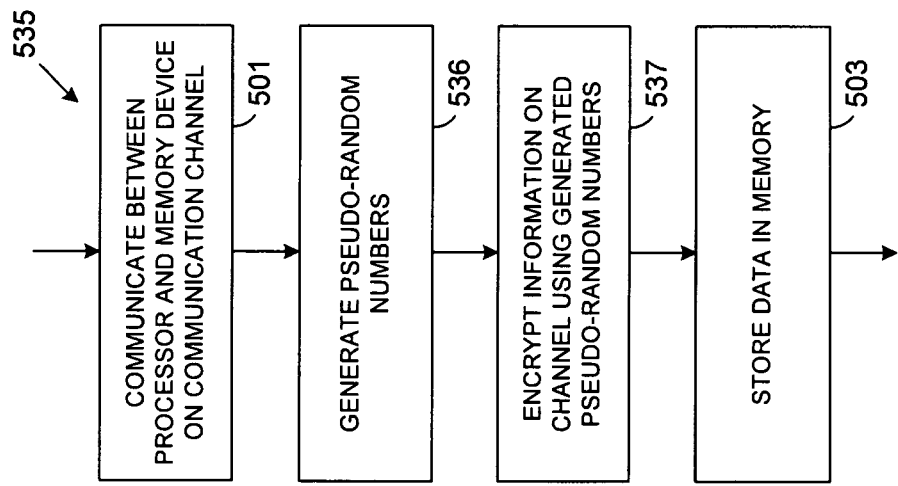
Figure 5G:
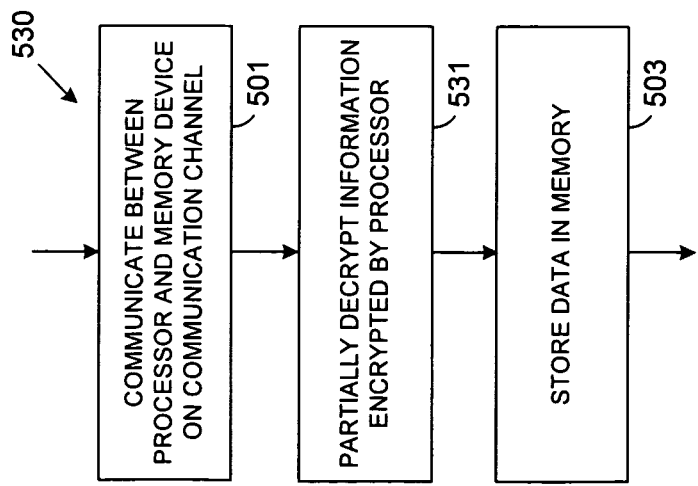

FIGS. 5E through 5G depict aspects of channel encryption operations that can be implemented in various method embodiments. For example, as shown in FIG. 5E, a channel encryption method 520 can further comprise decrypting 521 information encrypted by the processor.

Referring to FIG. 5F, a security method 525 can additionally comprise decrypting 526 address and data information encrypted by the processor, and storing 527 decrypted data at a decrypted address.

FIG. 5G depicts an encryption method 530 which can further comprise decrypting 531 information that is encrypted by the processor only partially.

Referring to FIG. 5H, an embodiment of an encryption method 535 can further comprise generating 536 pseudo-random numbers, and encrypting 537 information on the communication channel using the generated pseudo-random numbers.

As shown in FIG. 5I, a security method 540 can comprise assigning 541 a key on processor and memory sides of the communication channel, and performing 542 stream encryption of information communicated on the communication channel.

Figure 5J:
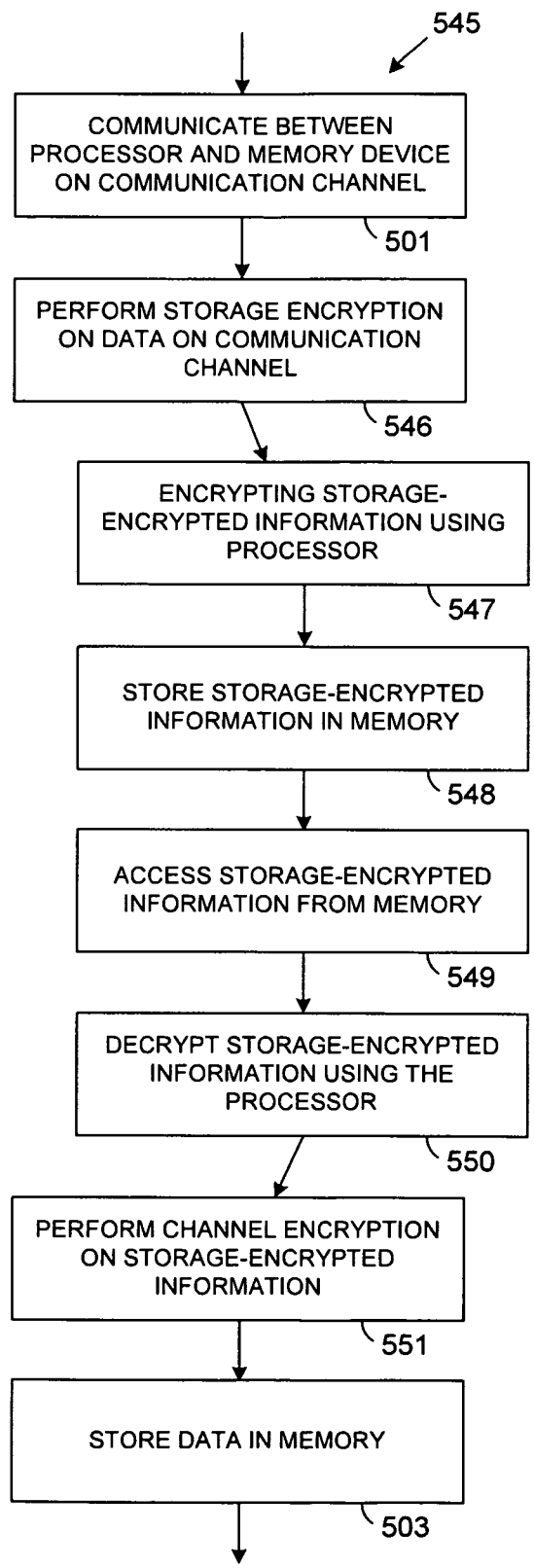

In some embodiments, a security method can combine channel encryption and storage encryption. For example, as depicted in FIG. 5J, a security method 545 can comprise storage-encrypting 546 information and performing 551 channel encryption operations on the communication channel for information that is storage encrypted. Storage-encrypting 546 information can comprise encrypting 547 storage-encrypted information using the processor, storing 548 the storage-encrypted information in the memory, accessing 549 the storage-encrypted information from the memory, and decrypting 550 the storage-encrypted information using the processor.

Figure 5M:
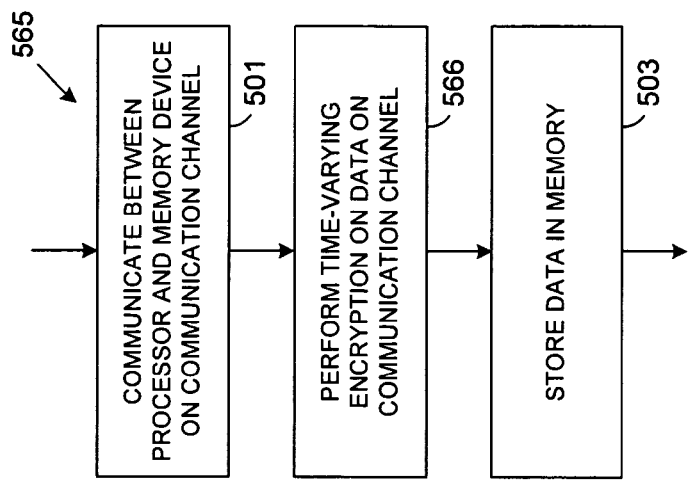
Figure 5L:
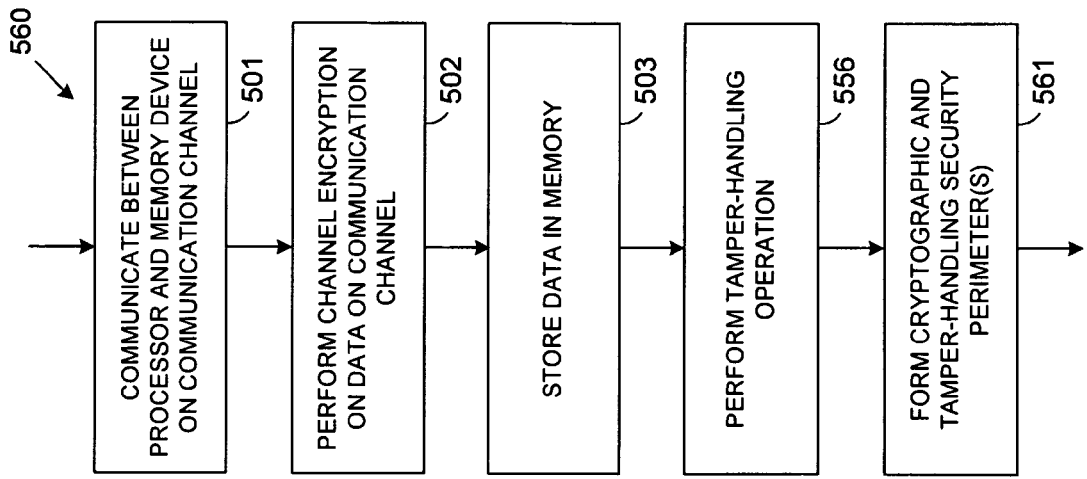
Figure 5K:
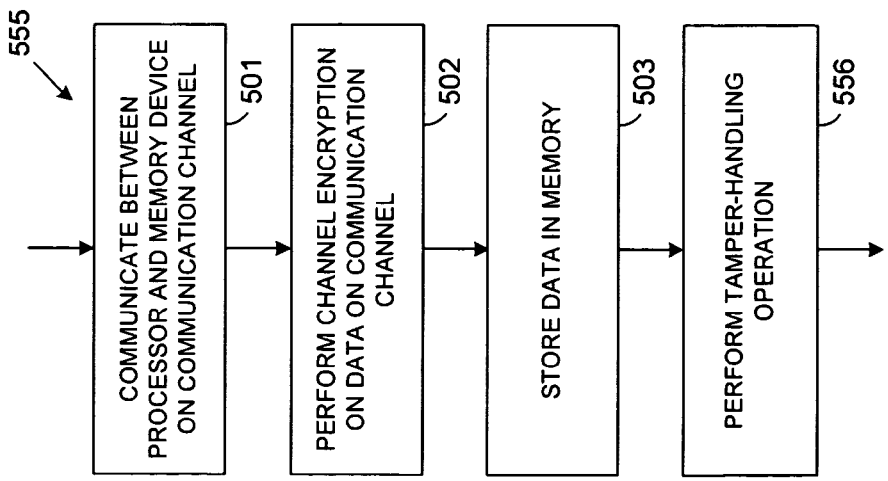

Referring to FIG. 5K, an embodiment of an encryption method 555 can additionally comprise performing 556 at least one tamper-handling operation of tamper-proofing, tamper-resistance, and tamper-evidence.

As shown in FIG. 5L, embodiments of a security method 560 can further comprise forming 561 at least one cryptographic and tamper-handling security perimeter enclosing at least one selected region of the memory.

Referring to FIG. 5M, an embodiment of an encryption method 565 can further comprise performing 566 time-varying encryption.

Referring to FIGS. 6A, 6B, 6C, and 6D, several schematic block diagrams respectively illustrate embodiments of a data handling apparatus 640 that makes use of a means 642 for performing channel encryption operations on a communication channel 604 to facilitate enable security capabilities, including cryptographic security. The data handling apparatus 640 can comprise means 644 for communicating data between a processor 606 and a memory 602 via a communication channel 604 and means 642 for performing channel encryption operations on the communication channel 604 that communicates information between the processor 606 and the memory 602. The data handling apparatus 640 can further comprise means 646 for storing the communicated data in the memory 602.

In some embodiments, the data handling apparatus 640 can further comprise means 648 for storing the communicated data in a hybrid memory 616 comprising a plurality of memory segments 618 characterized by a plurality of operating characteristics; and means 650 for performing encryption operations on the data 620 during transfers between ones of the plurality of memory segments 618. The data handling apparatus 640 can support any suitable configuration of plurality of memory segments 618 including, for example, cache 628, nonvolatile main memory 626, volatile main memory 624, a combination of volatile main memory 624 and nonvolatile main memory 626 wherein the volatile main memory 624 has faster operating characteristics than the nonvolatile main memory 626, and the like.

In various embodiments, the data handling apparatus 640 can extend to means 652 for performing encryption operations on the data during transfers between the processor 606 and the plurality of memory segments 618.

Embodiments of the data handling apparatus 640 can be configured for various security and encryption capabilities. For example, the data handling apparatus 640 can comprise one or more of means 654 for decrypting information encrypted by the processor 606, and means 660 for partially decrypting information encrypted by the processor 606. In some embodiments, the data handling apparatus 640 can comprise means 656 for decrypting address and data information encrypted by the processor 606, and means 658 for storing decrypted data at a decrypted address.

Figure 6A:
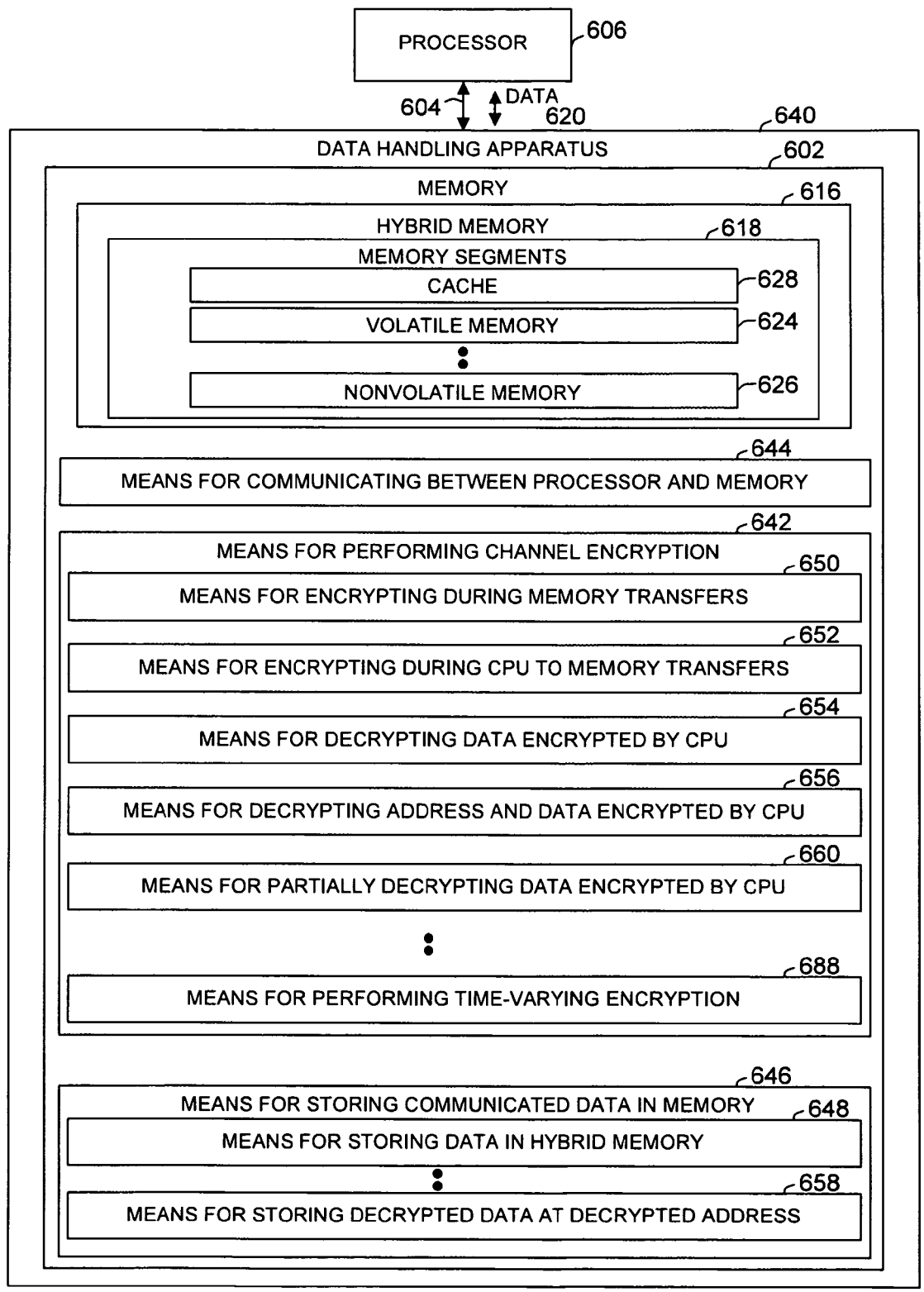
FIGS. 6A, 6B, 6C, and 6D are schematic block diagrams respectively illustrating embodiments of a data handling apparatus that makes use of a means for performing channel encryption operations on a communication channel to facilitate enable security capabilities, including cryptographic security.
Figure 6B:
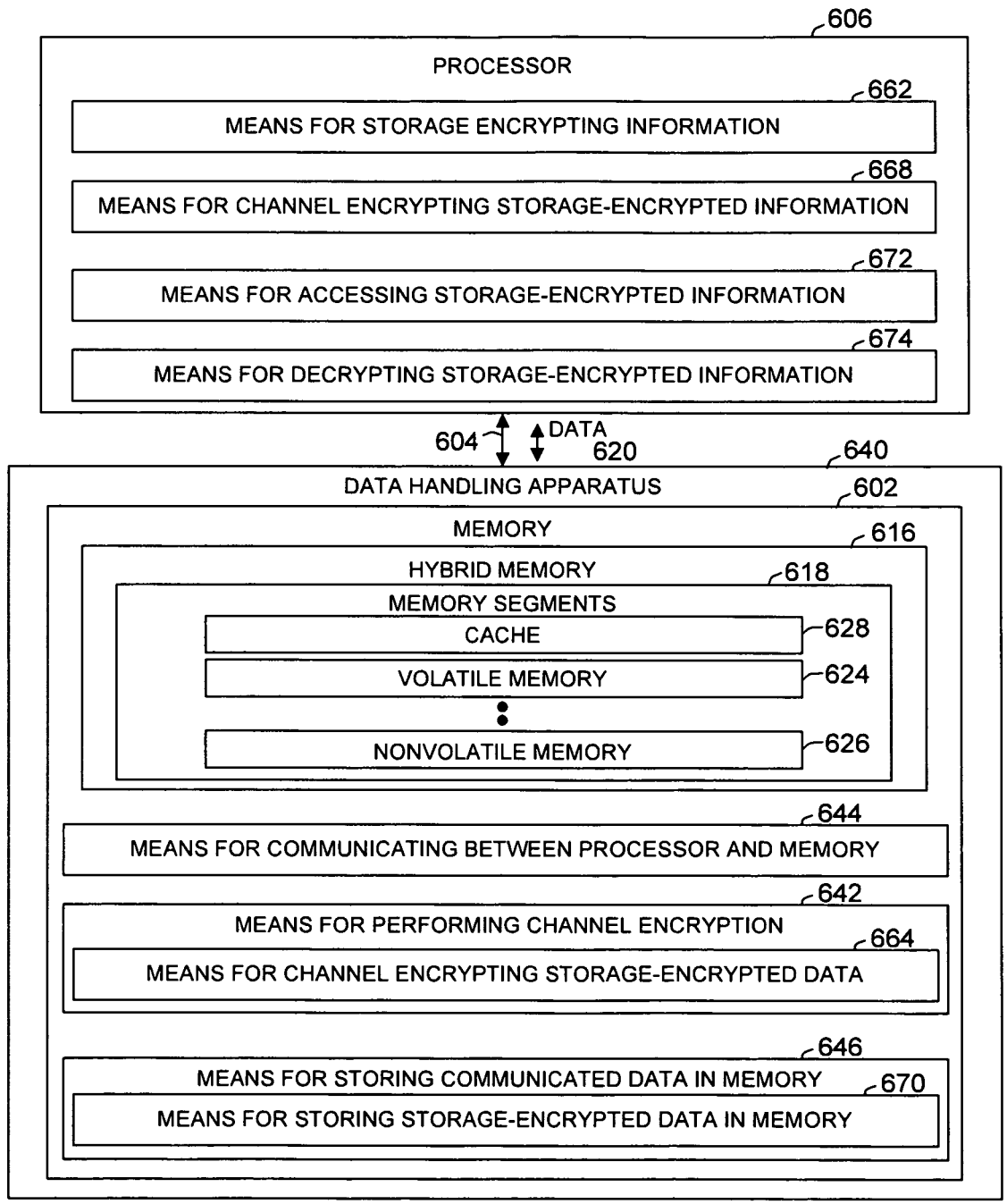

Referring to FIG. 6B, some embodiments and/or under select conditions the data handling apparatus 640 can enable a combination of storage encryption and channel encryption. The data handling apparatus 640 can comprise means 662 for storage-encrypting information and means 664 for performing channel encryption operations on the communication channel 604 for information that is storage encrypted. The means 662 for storage-encrypting information can further comprise means 668 for channel encrypting storage-encrypted information using the processor 606, means 670 for storing the storage-encrypted information in the memory 602, means 672 for accessing the storage-encrypted information from the memory 602, and means 674 for decrypting the storage-encrypted information using the processor 606.

Figure 6C:
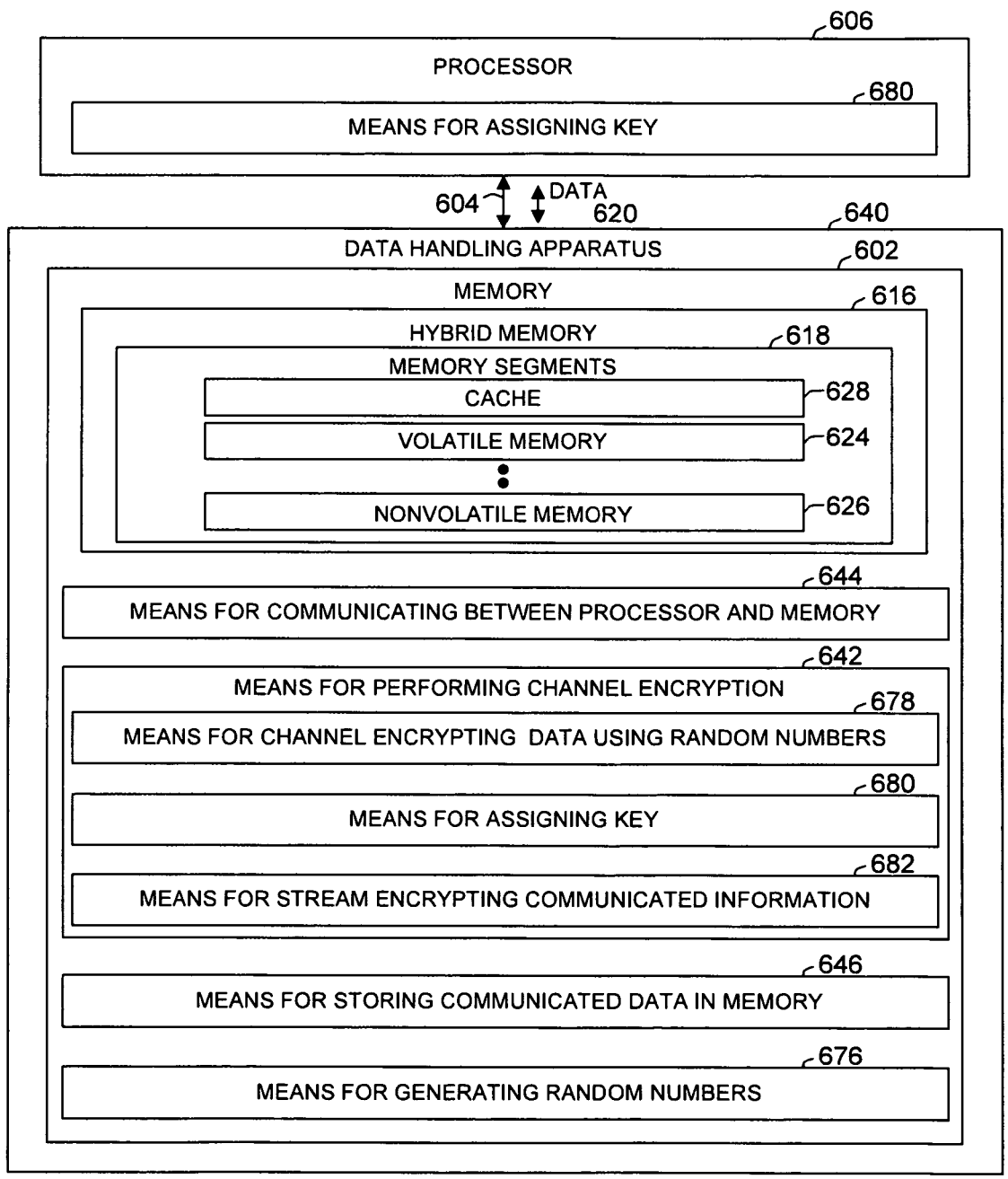

Referring to FIG. 6C, the data handling apparatus 640 can comprise computational devices, components, or other hardware to facilitate encryption. For example, the data handling apparatus 640 can further comprise means 676 for generating pseudo-random numbers, and means 678 for encrypting information on the communication channel 604 using the generated pseudo-random numbers.

In some embodiments, a channel encryption technique can operate wherein both sides of the channel have a key and use stream encryption, using any desired form of stream encryption ranging from full public key encryption to more simple streaming ciphers. The data handling apparatus 640 can further comprise means 680 for assigning a key on processor and memory sides of the communication channel 604, and means 682 for performing stream encryption of information communicated on the communication channel 604.

Figure 6D:
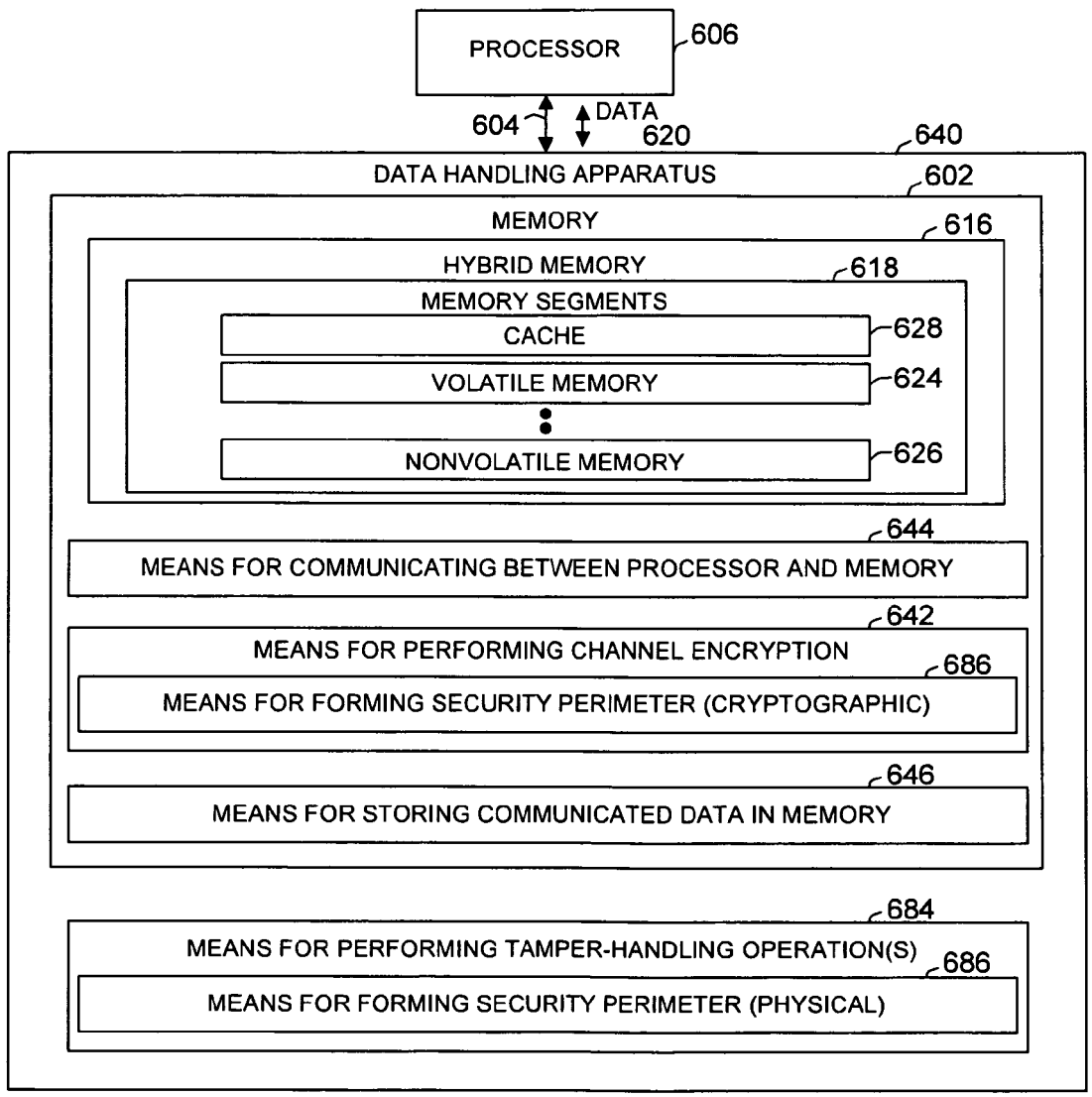

Referring to FIG. 6D, in some embodiments and applications the data handling apparatus 640 can be configured with a cryptographic and temper-handling perimeter security enhancement. The data handling apparatus 640 can thus further comprise means 684 for performing at least one tamper-handling operation of tamper-proofing, tamper-resistance, and tamper-evidence. The data handling apparatus 640 can also comprise means 686 for forming at least one cryptographic and tamper-handling security perimeter enclosing at least one selected region of the memory 602.

The data handling apparatus 640 can support channel encryption wherein the hybrid memory 616 can include intelligence or logic that enables randomization of encrypted information wherein encrypted data is read back and encryption can be stripped off by the receiving processor 606, and enables time-varying encryption. Data is written to an address which, when read back, is different, but no information is lost since the reading processor 606 or other reading device at the opposite side of the channel from the hybrid memory 616 has sufficient intelligence capability to strip off the encryption. Thus, the data handling apparatus 640 can comprise means 688 for performing time-varying encryption.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A memory device comprising:
   a memory operable to store data communicated via a communication channel from a processor; and
   logic-in-memory at least partially integrated with the memory and operable to perform channel encryption operations on the communication channel that communicates information between the processor and the memory, the logic-in-memory further operable to dynamically modify one or more address mappings in the memory in a manner that enables the processor to reprogram one or more addresses to correspond to the modification.

2. The memory device according to claim 1 wherein:
   the logic-in-memory at least partially integrated with the memory and operable to perform channel encryption operations is operable to decrypt information encrypted by the processor.

3. The memory device according to claim 1 wherein:
   the logic-in-memory at least partially integrated with the memory and operable to perform channel encryption operations is operable to decrypt address and data information encrypted by the processor and store data at the address.

4. The memory device according to claim 1 wherein:
   the logic-in-memory at least partially integrated with the memory and operable to perform channel encryption operations is operable to partially decrypt information encrypted by the processor.

5. The memory device according to claim 1 further comprising:
a pseudo-random number generator coupled to the memory and coupled to the logic-in-memory at least partially integrated with the memory and operable to perform channel encryption operations, the pseudo-random number generator operable to generate numbers for usage in encrypting information on the communication channel.

6. The memory device according to claim 1 wherein:
the logic-in-memory at least partially integrated with the memory and operable to perform channel encryption operations is operable to perform stream encryption of information communicated on the communication channel wherein processor and memory sides of the communication channel are assigned a key.

7. The memory device according to claim 1 wherein:
the logic-in-memory at least partially integrated with the memory and operable to perform channel encryption operations is operable to perform channel encryption operations on the communication channel for information that is storage encrypted wherein the storage-encrypted information is encrypted by the processor, stored in the memory, accessed from the memory, and decrypted by the processor.

8. The memory device according to claim 1 further comprising:
a tamper-handling device coupled to the memory and operable to handle physical intrusion to the memory.

9. The memory device according to claim 8 wherein:
the tamper-handling device is operable to perform at least one operation of tamper-proofing, tamper-resistance, and tamper-evidence.

10. The memory device according to claim 8 wherein:
the logic-in-memory at least partially integrated with the memory and operable to perform channel encryption operations and the tamper-handling device are operable to form at least one cryptographic and tamper-handling security perimeter enclosing at least one selected region of the memory.

11. The memory device according to claim 1 wherein:
the logic-in-memory at least partially integrated with the memory and operable to perform channel encryption operations is operable to perform time-varying encryption.

12. The memory device according to claim 1 wherein:
the logic-in-memory at least partially integrated with the memory and operable to perform encryption operations is operable to encrypt data communicated between the memory device and the processor according to an encryption model that is specified by a one-time pad that synchronizes encryption state between the memory device and the processor.

13. The memory device according to claim 1 wherein:
the logic-in-memory at least partially integrated with the memory and operable to perform encryption operations is operable to encrypt data communicated between the memory device and the processor according to an encryption model that is specified by a key schedule that synchronizes encryption state between the memory device and the processor.

14. The memory device according to claim 1 wherein:
the logic-in-memory at least partially integrated with the memory and operable to perform encryption operations is configured in combination with the processor according to an encryption model that is configured to synchronize encryption state between the memory device and the processor.

15. The memory device according to claim 1 wherein:
the logic-in-memory at least partially integrated with the memory and operable to perform encryption operations is configured in combination with the processor wherein the processor and the memory device are manufactured separately while upgraded in concert to specify an encryption model that is configured to synchronize encryption state between the memory device and the processor.

16. The memory device according to claim 1 wherein:
the logic-in-memory at least partially integrated with the memory and operable to perform encryption operations is configured in combination with the processor using one or more keys that are installed and assigned during manufacture for processors from one or more particular manufacturers and for memory devices from one or more memory suppliers to specify an encryption model that is configured to synchronize encryption state between the memory device and the processor.

17. The memory device according to claim 1 wherein:
the logic-in-memory at least partially integrated with the memory and operable to perform encryption operations is configured in combination with the processor using one or more keys that are installed and hard-wired during manufacture for processors from one or more particular manufacturers and for memory devices from one or more memory suppliers to specify an encryption model that is configured to synchronize encryption state between the memory device and the processor.

18. The memory device according to claim 1 wherein:
the logic-in-memory at least partially integrated with the memory and operable to perform encryption operations is configured in combination with the processor using one or more keys that are available at power-up to specify an encryption model that is configured to synchronize encryption state between the memory device and the processor.

19. The memory device according to claim 1 wherein:
the logic-in-memory at least partially integrated with the memory and operable to perform encryption operations is configured in combination with the processor according to an encryption model that is configured to synchronize encryption state between the memory device and the processor and protects against a man-in-the-middle attack in which an attacker has a logic analyzer connected between the processor and memory device to at least one of access, modify, or send data transmitted between the processor and the memory device.

20. The memory device according to claim 1 wherein:
the logic-in-memory at least partially integrated with the memory and operable to perform encryption operations is operable to receive a value $E_1(A,D)$ encrypted from address A and data D using channel encryption, and modify the value $E_1(A,D)$ into a value $E_2(A,D)$ for reading by the processor that is indicative of an encryption state different from the encryption state of the value $E_1(A,D)$ according to an encryption model that is configured to synchronize encryption state between the memory device and the processor.

21. A memory device comprising:
a hybrid memory comprising a plurality of memory segments characterized by a plurality of operating characteristics, the hybrid memory operable to store data communicated from a processor; and logic-in-memory at least partially integrated with the hybrid memory and operable to perform encryption operations on the data during transfers between one or more of the plurality of memory segments, the logic-in-memory further operable to dynamically modify one or more address mappings in the memory in a manner that enables the processor to reprogram one or more addresses to correspond to the modification.

22. The memory device according to claim 21 wherein:
the logic-in-memory at least partially integrated with the hybrid memory and operable to perform encryption operations is operable to perform encryption operations on the data during transfers between the processor and the plurality of memory segments.

23. The memory device according to claim 21 wherein:
the plurality of memory segments includes a volatile main memory.

24. The memory device according to claim 21 wherein:
the plurality of memory segments includes a nonvolatile main memory.

25. The memory device according to claim 21 wherein:
the plurality of memory segments includes a volatile main memory and a nonvolatile main memory wherein the volatile main memory has faster operating characteristics than the nonvolatile main memory.

26. The memory device according to claim 21 wherein:
the plurality of memory segments includes a cache.

27. The memory device according to claim 21 wherein:
the logic-in-memory at least partially integrated with the hybrid memory and operable to perform encryption operations encrypts data on a communication channel that communicates information between the processor and the hybrid memory.

28. The memory device according to claim 21 wherein:
the logic-in-memory at least partially integrated with the hybrid memory and operable to perform encryption operations is operable to decrypt information encrypted by the processor.

29. The memory device according to claim 21 wherein:
the logic-in-memory at least partially integrated with the hybrid memory and operable to perform encryption operations is operable to decrypt address and data information encrypted by the processor and store data at the address in the hybrid memory.

30. The memory device according to claim 21 wherein:
the logic-in-memory at least partially integrated with the hybrid memory and operable to perform encryption operations is operable to partially decrypt information encrypted by the processor.

31. The memory device according to claim 21 further comprising:
a pseudo-random number generator coupled to the hybrid memory and coupled to the logic-in-memory at least partially integrated with the hybrid memory and operable to perform encryption operations, the pseudo-random number generator operable to generate numbers for usage in encrypting information.

32. The memory device according to claim 21 wherein:
the logic-in-memory at least partially integrated with the hybrid memory and operable to perform encryption operations is operable to perform stream encryption of communicated information wherein processor and memory sides are assigned a key.

33. The memory device according to claim 21 wherein:
the logic-in-memory at least partially integrated with the hybrid memory and operable to perform encryption operations is operable to encrypt information that is storage encrypted wherein the storage-encrypted information is encrypted by the processor, stored in the hybrid memory, accessed from the hybrid memory, and decrypted by the processor.

34. The memory device according to claim 21 further comprising:
a tamper-handling device coupled to the hybrid memory and operable to handle physical intrusion to the hybrid memory.

35. The memory device according to claim 34 wherein:
the tamper-handling device is operable to perform at least one operation of tamper-proofing, tamper-resistance, and tamper-evidence.

36. The memory device according to claim 34 wherein:
the logic-in-memory at least partially integrated with the hybrid memory and operable to perform encryption operations and the tamper-handling device are operable to form at least one cryptographic and tamper-handling security perimeter enclosing at least one selected region of the hybrid memory.

37. The memory device according to claim 21 wherein:
the logic-in-memory at least partially integrated with the hybrid memory and operable to perform encryption operations is operable to perform time-varying encryption.

38. A memory device comprising:
a memory stack operable to store data communicated from a processor, the memory stack comprising:
   a storage structure including a plurality of memory elements operable to store data communicated via a communication channel from the processor; and
   logic-in-memory at least partially integrated with the plurality of memory elements and operable to perform encryption operations on the data during transfers between the processor and the storage structure, the logic-in-memory further operable to dynamically modify one or more address mappings in the memory in a manner that enables the processor to reprogram one or more addresses to correspond to the modification.

39. The memory device according to claim 38 wherein:
the logic-in-memory at least partially integrated with the plurality of memory elements and operable to perform encryption operations is operable to perform channel encryption operations on a communication channel that communicates information between the processor and the memory stack.

40. The memory device according to claim 38 wherein:
the logic-in-memory at least partially integrated with the plurality of memory elements and operable to perform encryption operations is operable to decrypt information encrypted by the processor.

41. The memory device according to claim 38 wherein:
the logic-in-memory at least partially integrated with the plurality of memory elements and operable to perform encryption operations is operable to partially decrypt information encrypted by the processor.

42. The memory device according to claim 38 wherein:
the logic-in-memory at least partially integrated with the plurality of memory elements and operable to perform encryption operations is operable to perform stream encryption of information communicated on a communication channel wherein processor and memory sides of the communication channel are assigned a key.

43. The memory device according to claim 38 wherein:
the logic-in-memory at least partially integrated with the plurality of memory elements and operable to perform encryption operations is operable to perform channel encryption operations on a communication channel for information that is storage encrypted wherein the storage-encrypted information is encrypted by the processor, stored in the memory stack, accessed from the memory stack, and decrypted by the processor.

44. The memory device according to claim 38 wherein:
the logic-in-memory at least partially integrated with the plurality of memory elements and operable to perform encryption operations is operable to perform time-varying encryption.

45. A memory device comprising:
a memory operable to store data communicated via a communication channel from a processor; and
logic-in-memory at least partially integrated with the memory and operable to perform channel encryption operations on the communication channel that communicates information between the processor and the memory, the logic-in-memory further operable to communicate with the processor using channel encryption with both address and data encrypted into a single encrypted value; wherein:
the logic-in-memory at least partially integrated with the memory and operable to perform encryption operations is operable to receive a value $E_1(A,D)$ encrypted from address A and data D using channel encryption, and modify the value $E_1(A,D)$ into a value $E_2(A,D)$ for reading by the processor that is indicative of an encryption state different from the encryption state of the value $E_1(A,D)$ according to an encryption model that is synchronized between the memory device and the processor.

46. The memory device according to claim 45 wherein:
the logic-in-memory at least partially integrated with the memory and operable to perform encryption operations is operable to receive a value $E_1(A,D)$ encrypted from address A and data D using channel encryption, and modify the value $E_1(A,D)$ into a value $E_2(A,D)$ for reading by the processor that is indicative of an encryption state different from the encryption state of the value $E_1(A,D)$ according to an encryption model that is specified by a key schedule synchronized between the memory device and the processor.

47. The memory device according to claim 45 wherein:
the logic-in-memory at least partially integrated with the memory and operable to perform encryption operations is operable to receive a value $E_1(A,D)$ encrypted from address A and data D using channel encryption, and modify the value $E_1(A,D)$ into a value $E_2(A,D)$ for reading by the processor that is indicative of an encryption state different from the encryption state of the value $E_1(A,D)$ according to an encryption model that is specified by a one-time pad synchronized between the memory device and the processor.

* * * * *